US010924665B2

(12) United States Patent
Kanda et al.

(10) Patent No.: US 10,924,665 B2
(45) Date of Patent: Feb. 16, 2021

(54) IMAGE PROCESSING APPARATUS, IMAGING APPARATUS, CONTROL METHODS THEREOF, AND STORAGE MEDIUM FOR GENERATING A DISPLAY IMAGE BASED ON A PLURALITY OF VIEWPOINT IMAGES

(71) Applicant: CANON KABUSHIKI KAISHA, Tokyo (JP)

(72) Inventors: Akihiko Kanda, Kawasaki (JP); Koichi Fukuda, Tokyo (JP); Yuki Yoshimura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 105 days.

(21) Appl. No.: 16/137,801

(22) Filed: Sep. 21, 2018

(65) Prior Publication Data
US 2019/0028640 A1 Jan. 24, 2019

Related U.S. Application Data

(63) Continuation of application No. PCT/JP2017/002504, filed on Jan. 25, 2017.

(30) Foreign Application Priority Data

Mar. 24, 2016 (JP) .............................. JP2016-060897
Jun. 3, 2016 (JP) .............................. JP2016-112103

(51) Int. Cl.
H04N 5/232 (2006.01)
G06T 5/00 (2006.01)
(Continued)

(52) U.S. Cl.
CPC .......... H04N 5/23229 (2013.01); G06T 3/20 (2013.01); G06T 5/001 (2013.01); G06T 7/557 (2017.01);
(Continued)

(58) Field of Classification Search
CPC .......... H04N 5/23229; H04N 5/23212; H04N 5/23296; H04N 5/232933;
(Continued)

(56) References Cited

U.S. PATENT DOCUMENTS

2012/0120264 A1* 5/2012 Lee .......................... G06T 7/20
348/208.4
2012/0287153 A1* 11/2012 Kashima ................ H04N 7/183
345/629
2014/0327771 A1* 11/2014 Malachowsky ...... G02B 3/0006
348/148

FOREIGN PATENT DOCUMENTS

CN 101616237 A 12/2009
CN 103581547 A 2/2014
(Continued)

OTHER PUBLICATIONS

Ren Ng et al., "Light Field Photography with a Hand-Held Plenoptic Camera", Stanford Tech Report CTSR Feb. 2005 11 pgs.
(Continued)

Primary Examiner — Mekonnen D Dagnew
(74) Attorney, Agent, or Firm — Cowan, Liebowitz & Latman, P.C.

(57) ABSTRACT

An image processing apparatus comprises at least one processor or circuit configured to perform the operations of following units: an obtaining unit configured to obtaining an image signal containing intensity information and angle information of an incident light beam, an operating unit configured to obtain a viewpoint changing operation and a focus position changing operation, and a processing unit configured to generate, based on a plurality of viewpoint images obtained based on the image signal, a display image by changing a viewpoint in accordance with the viewpoint (Continued)

changing operation, and changing a focus position in accordance with the focus position changing operation.

19 Claims, 30 Drawing Sheets

(51) Int. Cl.
*G06T 3/20* (2006.01)
*G06T 7/557* (2017.01)
*G06T 5/50* (2006.01)

(52) U.S. Cl.
CPC ..... *H04N 5/23212* (2013.01); *H04N 5/23296* (2013.01); *H04N 5/232933* (2018.08); *H04N 5/232945* (2018.08); *G06T 5/50* (2013.01); *G06T 2207/10052* (2013.01); *G06T 2207/20192* (2013.01); *G06T 2207/20224* (2013.01)

(58) Field of Classification Search
CPC ....... H04N 5/232945; H04N 5/232125; H04N 5/232939; H04N 9/64; H04N 9/793; H04N 5/225; G06T 5/001; G06T 3/20; G06T 7/557; G06T 2207/20192; G06T 2207/20224; G06T 2207/10052; G06T 5/50; G02B 7/28; G02B 7/34; G03B 13/36; G16H 30/40
See application file for complete search history.

(56) References Cited

FOREIGN PATENT DOCUMENTS

| | | | |
|---|---|---|---|
| JP | 2009-211335 | A | 9/2009 |
| JP | 2011-022796 | A | 2/2011 |
| JP | 2013-110556 | A | 6/2013 |
| JP | 2015-115818 | A | 6/2015 |
| JP | 2015-198340 | A | 11/2015 |
| JP | 2016024489 | A | 2/2016 |
| KR | 10-0557172 | B1 | 3/2006 |

OTHER PUBLICATIONS

The Foreign Patent Documents #1 and 3-5 were cited in the Apr. 25, 2017 International Search Report issued in International Application No. PCT/JP2017/002504.

The above foreign patent documents were cited in the Jan. 8, 2020 Korean Office Action, which is enclosed with an English Translation, that issued in Korean Patent Application No. 10-2018-7029815.

The above foreign patent documents were cited in the Mar. 12, 2020 Chinese Office Action, which is enclosed with an English Translation, that issued in Chinese Patent Application No. 201780019656.X.

* cited by examiner

PLAN VIEW a-a SECTIONAL VIEW

SECTIONAL VIEW PARALLEL TO OPTICAL AXIS

SECTIONAL VIEW PERPENDICULAR TO OPTICAL AXIS

F I G. 28
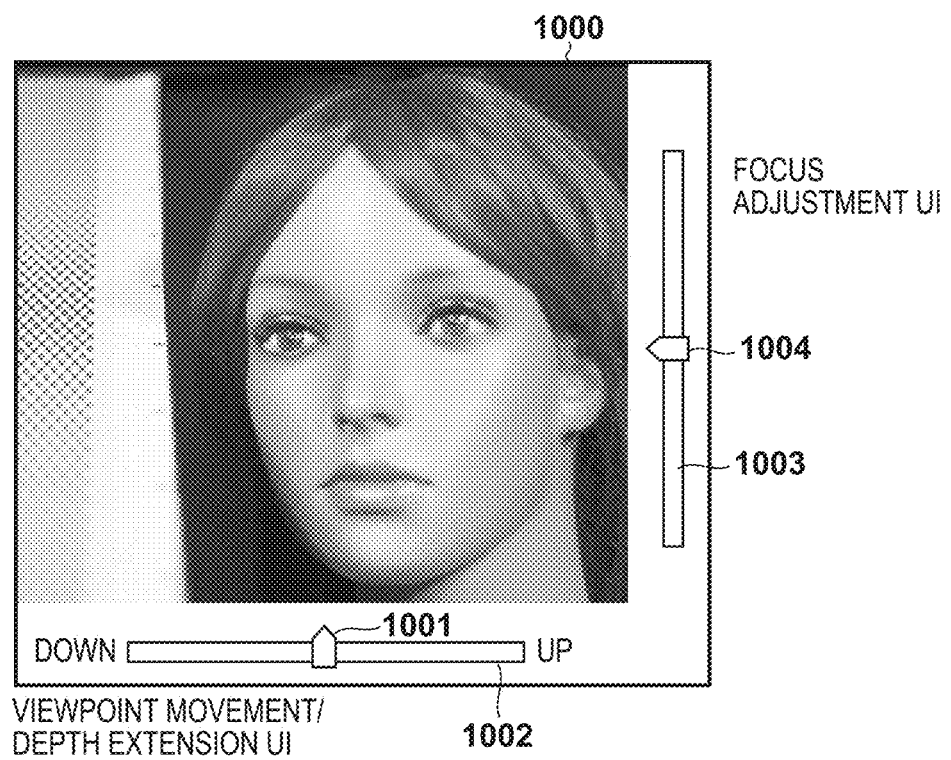

IMAGE PROCESSING APPARATUS, IMAGING APPARATUS, CONTROL METHODS THEREOF, AND STORAGE MEDIUM FOR GENERATING A DISPLAY IMAGE BASED ON A PLURALITY OF VIEWPOINT IMAGES

CROSS-REFERENCE OF RELATED APPLICATIONS

This application is a Continuation of International Patent Application No. PCT/JP2017/002504, filed Jan. 25, 2017, which claims the benefit of Japanese Patent Application No. 2016-060897, filed Mar. 24, 2016 and Japanese Patent Application No. 2016-112103, filed Jun. 3, 2016, both of which are hereby incorporated by reference herein in their entirety.

BACKGROUND OF THE INVENTION

Field of the Invention

The present invention relates to an image processing apparatus, an imaging apparatus, control methods thereof, and a storage medium for generation a display image based on a plurality of viewpoint images.

Background Art

An imaging apparatus capable of capturing a plurality viewpoint images at the same time by recording light beams having passed through different pupil regions of an imaging lens is known. NPL 1 has disclosed an imaging apparatus using an image sensor in which one microlens and a plurality of divided photoelectric converters are formed in one pixel. In this image sensor, the divided photoelectric converters receive light beams having passed through different pupil partial regions of an imaging lens through one microlens, thereby implementing so-called pupil division. Accordingly, an output signal is equivalent to LF (Light Field) data containing light intensity spatial distribution information and angle distribution information, so a plurality of viewpoint images can be obtained.

NPL 1 has also disclosed a refocusing technique capable of changing the focus position (also called the in-focus position) of a captured image after imaging by generating a synthetic image formed on a virtual plane different from an imaging plane by using the obtained LF data.

CITATION LIST

Non Patent Literature

NPL 1: Ren. Ng, and seven others, "Light Field Photography with a Hand-Held Plenoptic Camera", Stanford Tech Report CTSR 2005-02

It is sometimes necessary to concurrently perform an operation of displaying an image having a changed viewpoint (a viewpoint changed image), and an operation of displaying an image having a changed focus position by the refocusing technique, based on a plurality of viewpoint images. However, NPL 1 does not take account of a method of concurrently operating the display of a viewpoint changed image and the display of an image having a changed focus position.

The present invention has been made in consideration of the above problem. That is, the present invention provides a technique capable of concurrently performing an operation of displaying a viewpoint changed image and an operation of displaying an image having a changed focus position, based on a plurality of viewpoint images.

SUMMARY OF THE INVENTION

To solve the above problem, an image processing apparatus of the present invention has the following arrangement. That is, the image processing apparatus includes: at least one processor or circuit configured to perform the operations of following units: an obtaining unit configured to obtain an image signal containing intensity information and angle information of an incident light beam; an operating unit configured to accept a viewpoint changing operation and a focus position changing operation; and a processing unit configured to generate, based on a plurality of viewpoint images obtained based on the image signal, a display image by changing a viewpoint in accordance with the viewpoint changing operation, and changing a focus position in accordance with the focus position changing operation.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention and, together with the description, serve to explain the principles of the invention.

FIG. 28 is a view schematically showing notation examples of the viewpoint movement UI and focus adjustment UI according to the fourth embodiment.

DESCRIPTION OF THE EMBODIMENTS

First Embodiment

Exemplary embodiments of the present invention will be explained in detail below with reference to the accompanying drawings. Note that an example in which the present invention is applied to an arbitrary digital camera capable of obtaining LF data will be explained below as an example of an image processing apparatus. However, the present invention is applicable not only to a digital camera but also to arbitrary devices capable of processing obtained LF data. These devices can include, for example, a portable phone, a game machine, a tablet terminal, a personal computer, wristwatch-type and eyeglass-type information terminals, a monitoring system, an onboard system, a medical system such as an endoscope, and a robot capable of providing an image. The present invention can also include an arrangement in which an arbitrary device transmits LF data and operation contents to a server device (including a virtual machine) which exists on the Internet or a local network and includes a processing means such as a processor, and this server device executes a part or the whole of processing on the LF data. In this case, the present invention can include an arrangement which receives the processing result from the arbitrary device or server device and displays the processing result.

(Whole Configuration of Digital Camera 100)

Figure 1:
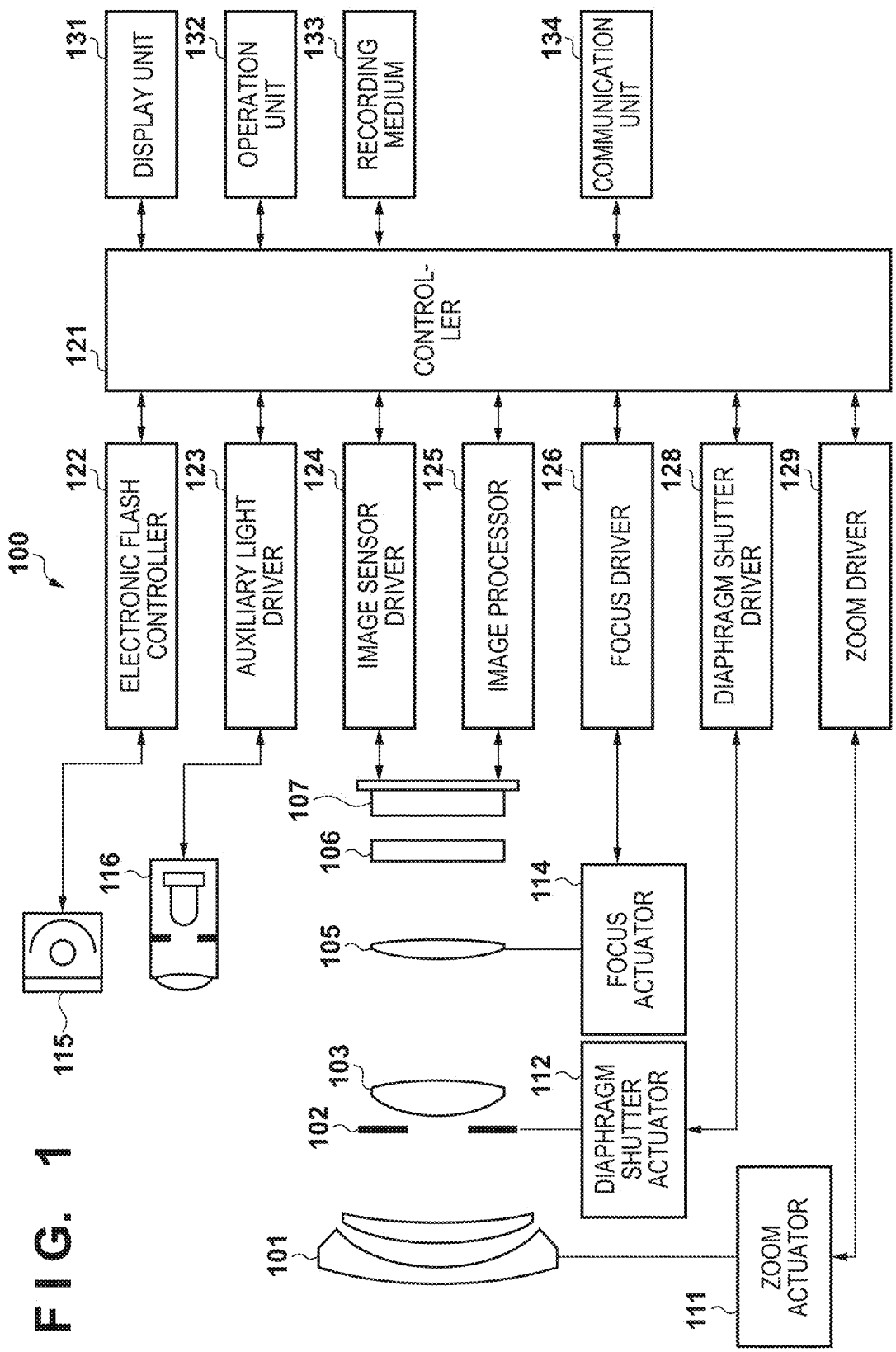
FIG. 1 is a block diagram showing a functional configuration example of a digital camera as an example of an image processing apparatus according to an embodiment of the present invention.

FIG. 1 is a block diagram showing a functional configuration example of a digital camera 100 as an example of the image processing apparatus of this embodiment. Note that one or more functional blocks shown in FIG. 1 can be implemented by hardware such as an ASIC or programmable logic array (PLA), and can also be implemented by a programmable processor such as a CPU or MPU by executing software. One or more functional blocks may also be implemented by combining software and hardware. In the following explanation, therefore, even when different functional blocks are described as main operation parts, they can be implemented by the same hardware as a main part.

A first lens group 101 includes, for example, a zoom lens forming an image formation optical system, and is arranged at the distal end of the image formation optical system, and held to be movable forward and backward in the optical-axis direction. A shutter 102 includes a stop, and adjusts the amount of light entering an image sensor 107 during imaging by adjusting the aperture diameter of the stop. When capturing a still image, the shutter 102 functions as a shutter for adjusting the exposure time. The shutter 102 and a second lens group 103 forming the image formation optical system together move forward and backward in the optical-axis direction, and implement a magnification varying action (zooming function) in cooperation with the forward/backward movement of the first lens group 101.

A third lens group 105 includes, for example, a focusing lens forming the image formation optical system, and performs focusing by the forward/backward movement in the optical-axis direction. An optical element 106 includes an optical low-pass filter, and reduces a false color and moire of a captured image. The image sensor 107 includes, for example, an image sensor formed by a CMOS photosensor and peripheral circuits, and is arranged on the image formation plane of the image formation optical system.

A zoom actuator 111 includes a driving device for causing the forward/backward movements of the first and second lens groups 101 and 103, and drives the first and second lens groups 101 and 103 forward and backward in the optical-axis direction by pivoting a cam cylinder (not shown). A diaphragm shutter actuator 112 includes a driving device for causing the operation of the shutter 102, and controls the aperture diameter and shutter operation of the shutter 102 under the control of a diaphragm shutter driver 128. A focus actuator 114 includes a driving device for causing the forward/backward movement of the third lens group 105, and performs focusing by driving the third lens group 105 forward and backward in the optical-axis direction.

An illuminating device 115 includes an object illuminating electronic flash for imaging. For example, the illuminating device 115 is a flash illuminating device using a xenon tube, or an illuminating device including an LED which continuously emits light. An auxiliary light emitting unit 116 includes an AF auxiliary light emitting device, and projects an image of a mask having a predetermined aperture pattern onto a field through a light projecting lens, thereby improving the focus detectability for a dark object or low-contrast object.

A controller 121 includes a CPU for MPU), ROM, and RAM, and controls each unit of the whole digital camera 100 by loading a program stored in the ROM in the RAM and executing the program, thereby executing a series of operations such as AF, imaging, image processing, and recording. The controller 121 can also include an A/D converter, D/A converter, communication interface circuit, and the like. Furthermore, the controller 121 can have a function as a display controller for controlling contents to be displayed on a display unit 131, and can also execute processing to be executed by an image processor 125 instead of the image processor 125.

An electronic flash controller 122 includes a control circuit or control module, and controls the lighting of the illuminating device 115 in synchronism with an imaging operation. An auxiliary light driver 123 controls the lighting of the auxiliary light emitting unit 116 in synchronism with a focus detecting operation. An image sensor driver 124 controls the imaging operation of the image sensor 107, A/D-converts an obtained image signal, and transmits the converted signal to the controller 121. The image processor 125 performs processing such as γ conversion, color interpolation, and PEG compression on the image obtained by the image sensor 107.

Each of the focus driver 126, diaphragm shutter driver 128, and zoom driver 129 includes a control circuit or control module. The focus driver 126 controls the focus actuator 114 based on the focus detection result. The diaphragm shutter driver 128 controls the diaphragm shutter actuator 112 at a predetermined timing of the imaging operation. The zoom driver 129 controls the zoom actuator 111 in accordance with a zoom operation by the user.

The display unit 131 includes a display device such as an LCD, and displays, for example, information of the imaging mode of the camera, a preview image before imaging and a check image after imaging, and a display image of the in-focus state during focus detection. An operation unit 132 includes switches for operating the digital camera 100, such as a power switch, release (imaging trigger) switch, zoom operation switch, and imaging mode selection switch. When the operation unit 132 transmits an input user operation to the controller 121, the controller 121 controls each unit of the digital camera 100 in order to execute an operation corresponding to the user operation. A recording medium 133 includes a detachable flash memory or the like, and records captured images.

A communication unit 134 includes a communication circuit or module, and establishes communication with an external apparatus (for example, a server installed outside) by using a communication method complying with a predetermined standard. For example, the communication unit 134 uploads image data to the external apparatus, downloads image data from the external apparatus, and receives the result of predetermined processing performed on the uploaded image data by the external apparatus.

(Arrangement of Image Processor 125)

Figure 2:
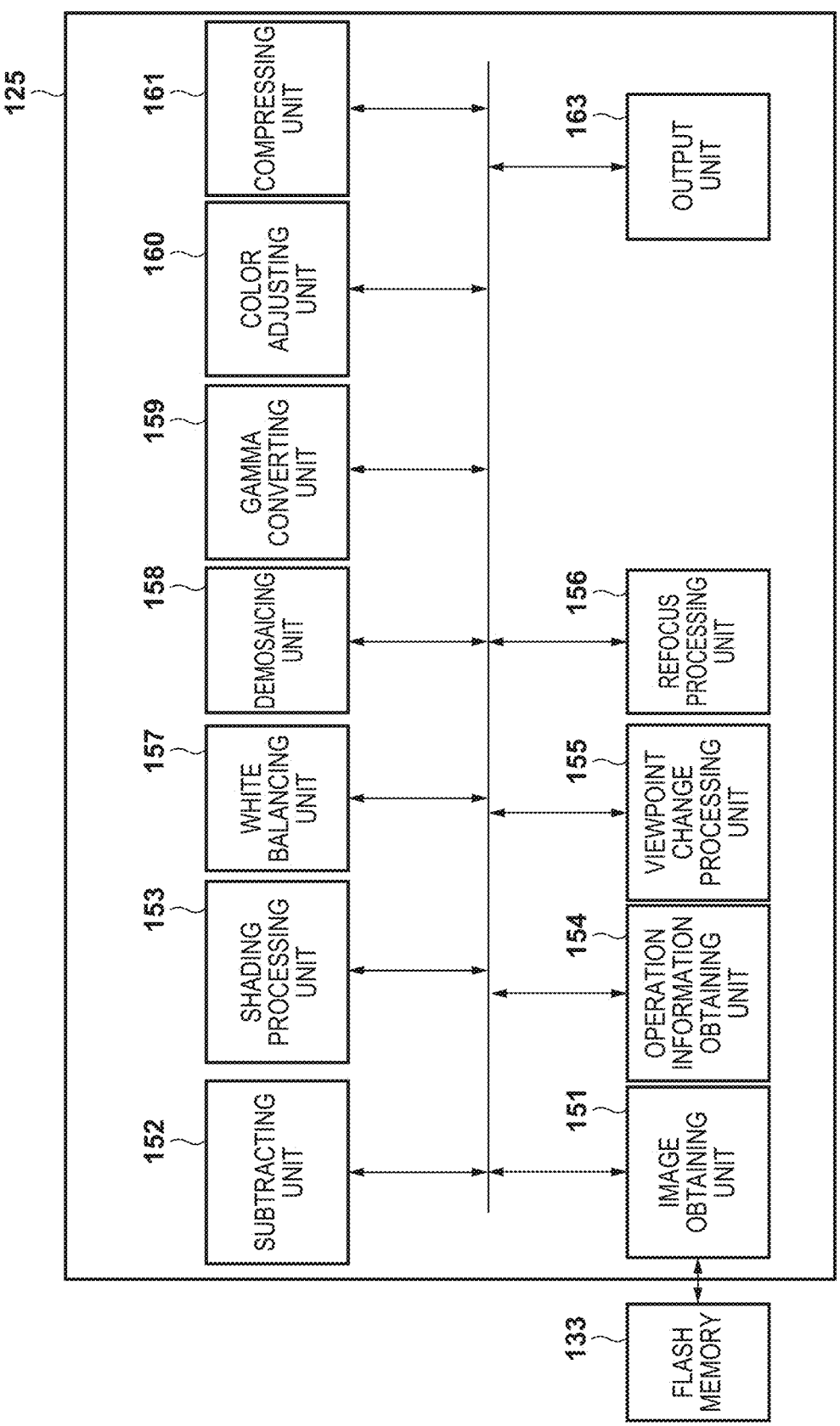
FIG. 2 is a block diagram showing a functional configuration example of an image processing unit according to the first embodiment.

The arrangement of the image processor 125 will be explained below with reference to FIG. 2. An image obtaining unit 151 saves image data read out from the recording medium 133. This image data is image data containing an image obtained by synthesizing a first viewpoint image and second viewpoint image (to be described later) (also called an A+B image), and the first viewpoint image.

A subtracting unit 152 generates the second viewpoint image by subtracting the first viewpoint image from the A+B image. A shading processing unit 153 corrects a light amount change caused by the image heights of the first and second viewpoint images. An operation information obtaining unit 154 receives adjustment values for viewpoint movement and refocusing changed by the user, and supplies the adjustment values manipulated by the user to a viewpoint change processing unit 155 and a refocus processing unit 156.

The viewpoint change processing unit 155 synthesizes a viewpoint changed image by changing the addition ratio (weighting) of the first and second viewpoint images. As will be described in detail later, an image having an extended or reduced depth of field can be generated by the processing of the viewpoint change processing unit 155. The refocus processing unit 156 generates a synthetic image by performing shift addition on the first and second viewpoint images in the pupil dividing direction, thereby generating images having different focus positions. This processing by the refocus processing unit 156 will also be described in detail later.

Also, the image processor 125 performs a developing process by using a white balancing unit 157, a demosaicing unit 158, a gamma converting unit 159, and a color adjusting unit 160 to be explained below. The white balancing unit 157 performs a white balancing process. More specifically, the white balancing unit 157 gains R, G, and B so that R, G, and B become equal colors in a white region. By performing this white balancing process before a demosaicing process, it is possible to prevent a determination error when calculating the saturation by avoiding the saturation from becoming higher than the saturation of a false color by color fogging or the like.

The demosaicing unit 158 interpolates color mosaiced image data of two colors of the three primary colors, which are lacking in each pixel, thereby generating a color image having all of R, G, and B color image data in all pixels. The demosaicing unit 158 interpolates a pixel of interest by using pixels around the pixel of interest. After that, the demosaicing unit 158 generates color image data of the three primary colors R, G, and B as the interpolation result for each pixel.

The gamma converting unit 159 applies a gamma correcting process to the color image data of each pixel, thereby generating color image data matching, for example, the display characteristics of the display unit 131. The color adjusting unit 160 applies, to the color image data, various color adjusting processes such as noise reduction, saturation emphasis, hue correction, and edge emphasis which are processes for improving the appearance of an image.

A compressing unit 161 compresses the color-adjusted color image data by a method complying with a predetermined compression method such as JPEG, thereby reducing the data size of the color image data when the data is recorded. An output unit 163 outputs the above-described color image data or compressed image data, or display data for a user interface.

(Arrangement of Imaging Element 107)

Figure 3:
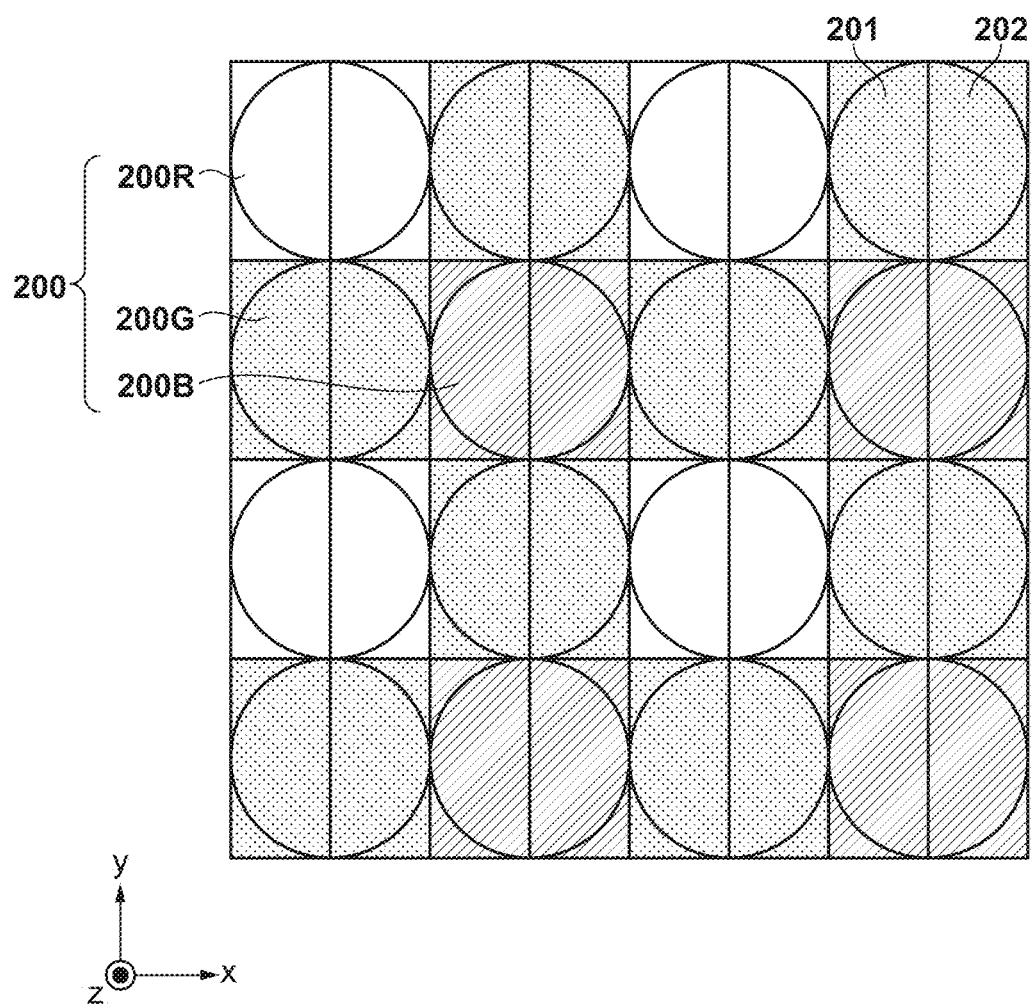
FIG. 3 is a view schematically showing a pixel array according to the first embodiment.

The arrays of pixels and subpixels in the image sensor 107 according to this embodiment will be explained with reference to FIG. 3. FIG. 3 shows a two-dimensionally arranged pixel array within a range of 4 columns×4 rows, and also shows a subpixel array included in each pixel within a range of 8 columns×4 rows.

In this pixel array shown in FIG. 3, the 2 columns×2 rows of pixels include a pixel 200R having the spectral sensitivity of R (red) in the upper left corner, pixels 200G having the spectral sensitivity of G (green) in the upper right and lower left corners, and a pixel 200B having the spectral sensitivity of B (blue) in the lower right corner. In addition, each pixel includes subpixels 201 and 202 arranged in 2 columns×1 row.

A captured image (or focus detection signal) can be obtained by two-dimensionally arranging a large number of 4 columns×4 rows of pixels (8 columns×4 rows of subpixels) shown in FIG. 3. In the image sensor 107, for example, a period P of the pixel arrangement is 4 µm, a number N of pixels is 5575 columns×3725 rows=about 20750000 pixels, a column-direction period PS of subpixels is 2 µm, and a number NS of subpixels is 11150 columns×3725 rows=about 41500,000 pixels.

Figure 4A:
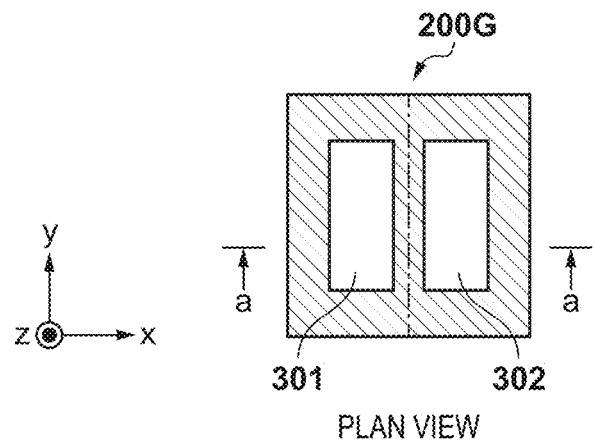
FIGS. 4A and 4B are a plan view and sectional view schematically showing a pixel according to the first embodiment.
Figure 4B:
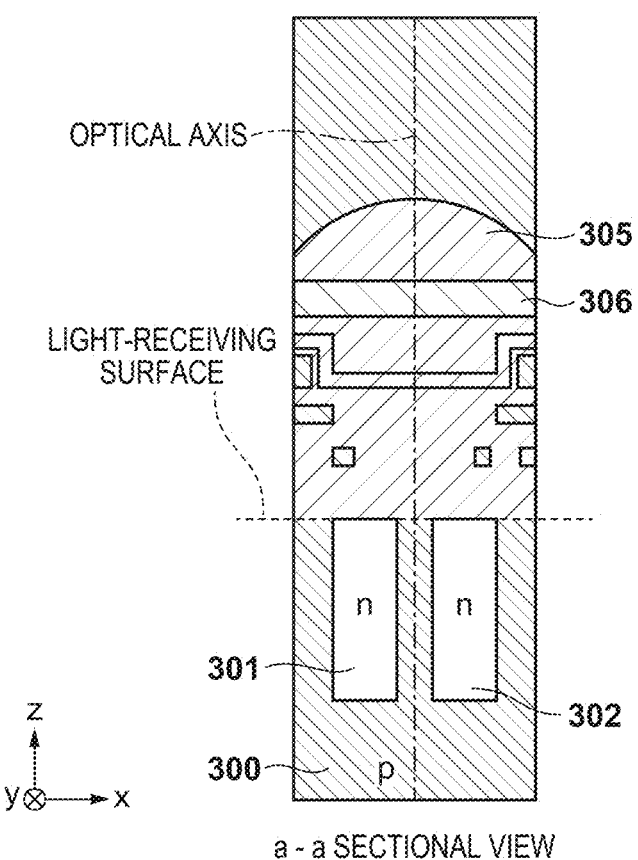

The structure of the pixel 200G shown in FIG. 3 will be explained in more detail below. FIG. 4A is a plan view showing the pixel 200G from the light-receiving surface side (+z side) of the image sensor 107, and FIG. 4B is a sectional view showing an a —a section in FIG. 4A from the —y side.

The pixel 200G is so formed as to have photoelectric converters 301 and 302 divided by NH (divided into two) in the x direction and divided by NV (divided into one) in the y direction. The photoelectric converters 301 and 302 respectively correspond to the subpixels 201 and 202.

The pixel 200G has a microlens 305 for condensing incident light toward the light-receiving side (+z direction) of the pixel, and is so configured that a light beam having entered through the microlens 305 is received by the photoelectric converter 301 or 302. Each of the photoelectric converters 301 and 302 can be a pin-structure photodiode formed by sandwiching an intrinsic layer between p-type and n-type layers, and can also be a pn-junction photodiode by omitting the intrinsic layer as needed. A color filter 306 is arranged between the microlens 305 and the photoelectric converters 301 and 302, and passes light having a predetermined frequency. FIG. 4B shows an example in which one color filter 306 is formed in one pixel 200G. However, it is also possible to form color filters having different spectral transmittances in each subpixel, or omit a color filter, as needed.

In the photoelectric converters 301 and 302, pairs of electrons and holes are generated in accordance with the received light amount, and separated by a depletion layer. After that, the electrons having a negative electric charge are stored in the n-type layer, and the holes are output outside the image sensor 107 through a p-type layer 300 connected to a constant-voltage source (not shown). The electrons stored in the n-type layers of the photoelectric converters 301 and 302 are transferred to a capacitance portion (FD) via a transfer gate, and converted into a voltage signal.

(Relationship Between Pixel Structure of Imaging Element 107 and Pupil Division)

Figure 5:
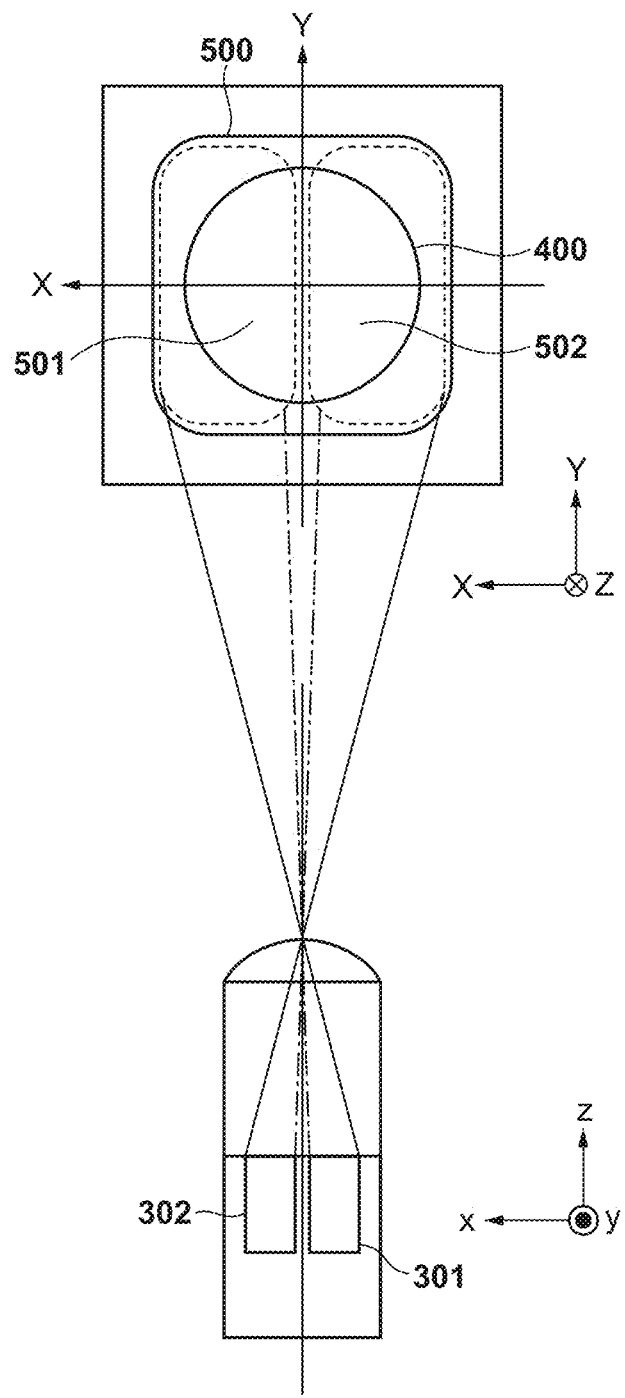
FIG. 5 is a view for explaining an outline of pupil division according to the first embodiment.

The relationship between the pixel structure of the image sensor 107 shown in FIGS. 4A and 4B and pupil division will now be explained with reference to FIG. 5. FIG. 5 shows the relationship between a sectional view in which the a —a section of the pixel 200G shown in FIG. 4A is viewed from the side, and the exit pupil plane of an image formation optical system. Note that in FIG. 5, the x-axis and y-axis of the sectional view of the pixel 200G are inverted from those shown in FIGS. 4A and 4B so as to match the coordinate axes of the exit pupil plane.

A pupil partial region 501 of the subpixel 201 represents a pupil region through which the subpixel 201 can receive light. The gravity center of the pupil partial region 501 of the subpixel 201 is biased toward the +X side on the pupil plane, and the light-receiving surface of the photoelectric converter 301 having the gravity center biased in the −x direction and the microlens generally have a conjugate relationship.

On the other hand, a pupil partial region 502 of the subpixel 202 represents a pupil region through which the subpixel 202 can receive light. The gravity center of the pupil partial region 502 of the subpixel 202 is biased toward the −X side on the pupil plane, and the light-receiving surface of the photoelectric converter 302 having the gravity center biased in the direction and the microlens generally have a conjugate relationship. Note that a pupil region 500 is a pupil region through which light can be received by the whole pixel 200G including both the photoelectric converters 301 and 302 (the subpixels 201 and 202).

Figure 6A:
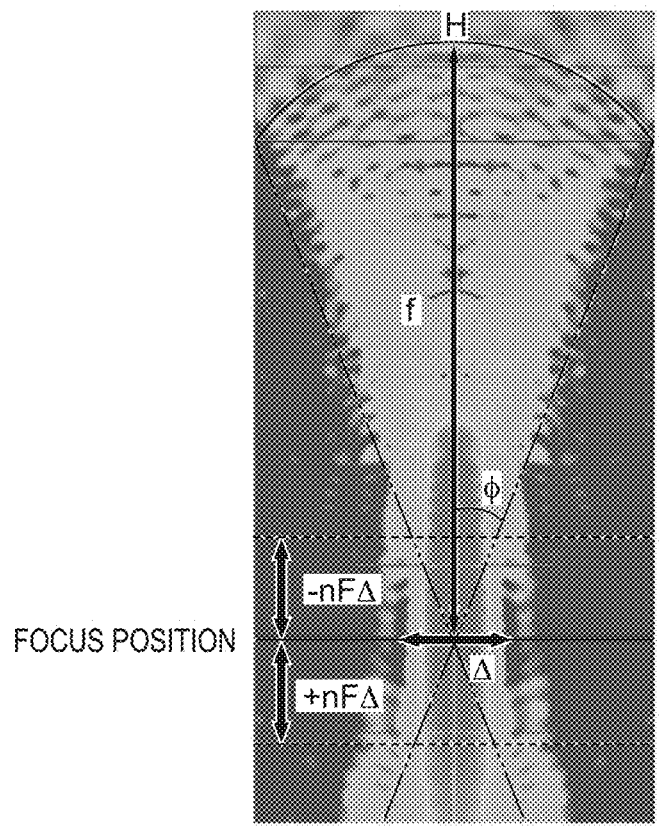
FIGS. 6A and 6B are views for explaining an example of the light intensity distribution inside the pixel according to the first embodiment.
Figure 6B:
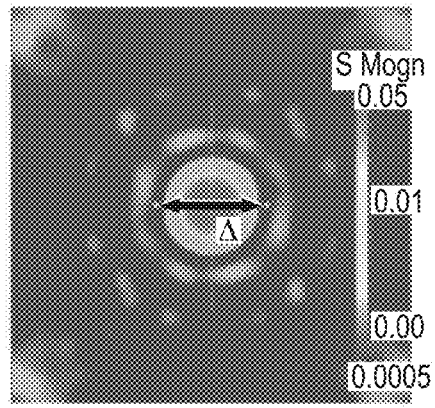

The way light enters the pixel 200G having the above-described arrangement will be explained in more detail below. FIGS. 6A and 6B show an example of the light intensity distribution when light enters the microlens 305 formed in the pixel 200G. FIG. 6A shows the light intensity distribution in a section parallel to the microlens optical axis, and FIG. 6B shows the light intensity distribution in a section perpendicular to the microlens optical axis in the microlens focal position. Referring to FIG. 6A, H denotes the surface on the convex side of the microlens 305; f, the focal length of the microlens; nFΔ, the movable range of the focal position obtained by refocusing (to be described later); and φ, a maximum angle of an incident light beam.

The microlens 305 condenses the incident light to the focal position, but the diameter of the condensation spot does not become smaller than a diffraction limit Δ and has a finite size as shown in FIGS. 6A and 6B due to the influence of diffraction of light fluctuation. For example, when the size of the light-receiving surface of the photoelectric converter 301 is about 1 to 2 µm, the condensation spot of the microlens is also about 1 µm. Therefore, the pupil partial region 501 (the pupil partial region 502 for the photoelectric converter 302) having the conjugate relationship with the light-receiving surface of the photoelectric converter 301 via the microlens 305 forms a light reception ratio distribution (pupil intensity distribution) in which pupil division is not clearly performed due to a diffraction blur.

Figure 7:
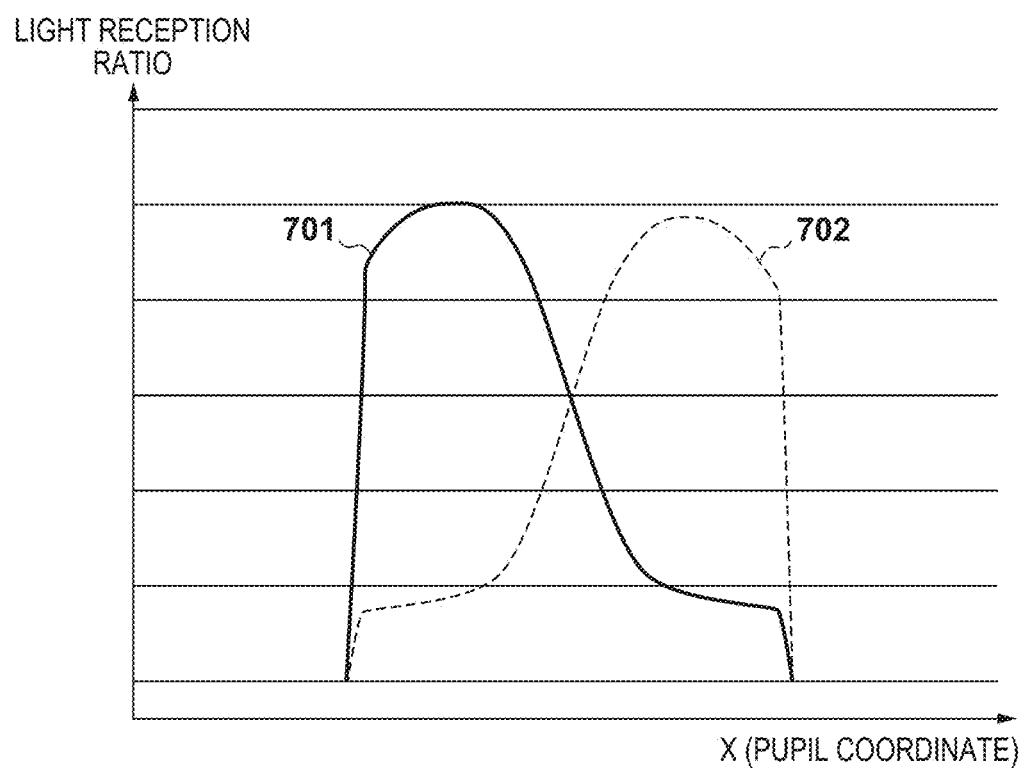
FIG. 7 is a view for explaining an example of the pupil intensity distribution according to the first embodiment.

FIG. 7 schematically shows the pupil intensity distribution in the pixel 200G by plotting the pupil coordinate on the abscissa and the light reception ratio on the ordinate. Note that a pupil intensity distribution 701 shows an example (the solid line) of a pupil intensity distribution taken along the X-axis of the pupil partial region 501 shown in FIG. 5, and a pupil intensity distribution 702 shows an example (the broken line) of a pupil intensity distribution taken along the X-axis of the pupil partial region 502. FIG. 7 reveals that the pupil partial regions 501 and 502 have gentle pupil intensity peaks in different pupil positions, and light having passed through the microlens 305 is gently divided into pupils.

Figure 8A:
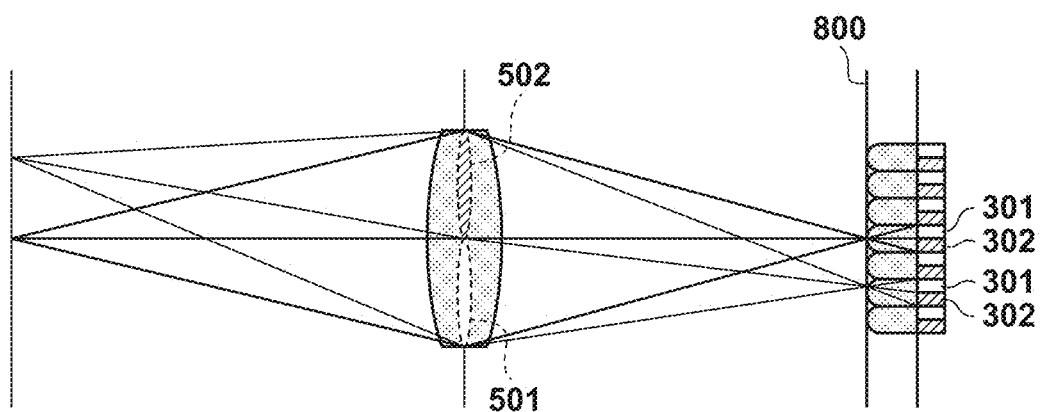
FIG. 8A is a view for explaining the relationship between an image sensor and pupil division according to the first embodiment.

FIG. 8A shows the relationship between pupil division and pixels in different positions of the image sensor 107. Light beams having passed through different pupil partial regions (the pupil partial regions 501 and 502) pass through an imaging plane 800 and enter the pixels of the image sensor 107 at different angles. Then, the subpixel 201 (the photoelectric converter 301) and the subpixel 202 (the photoelectric converter 302) of each 2×1-divided pixel receive the light beams. That is, in the image sensor 107, a plurality of pixels each including a plurality of subpixels so configured as to receive light beams passing through different pupil partial regions of the image formation optical system are arrayed.

By using the image sensor 107 having this arrangement, it is possible to generate a first viewpoint image by collecting light reception signals of the subpixels 201 of each pixel, and a second viewpoint image by collecting light reception signals of the subpixels 202 of each pixel. That is, a plurality of viewpoint images can be generated for each of different pupil partial regions from an input image obtained by each pixel of the image sensor 107. Note that in this embodiment, each of the first and second viewpoint images is a Bayer-array image, so a demosaicing process can be applied to the first and second viewpoint images as needed. Also, a captured image having a resolution of an effective pixel number N can be generated by adding and reading out signals from the subpixels 201 and 202 for each pixel of the image sensor. In this embodiment, an example using a captured image generated from a plurality of viewpoint images (the first and second viewpoint images) will be explained. Note that FIG. 8A shows an example in which the pupil region is divided into two regions in the horizontal direction, but pupil division may also be performed in the vertical direction in accordance with a subpixel dividing method. However, the present invention is not limited to this, and this embodiment and other embodiments are applicable to any arrangement capable of obtaining a plurality of viewpoint images by a well-known technique. For example, different cameras having a plurality of viewpoints can be regarded as the image sensor 107 as disclosed in Japanese Patent Laid-Open No. 2011-22796. Unlike the optical system shown in FIG. 1, it is also possible to form, on a microlens array, an image of a light beam from an imaging optical system, and form an image sensor on the image formation plane, so that the object plane and image sensor have the conjugate relationship. Furthermore, it is also possible to reform, on a microlens array, an image of a light beam from an imaging optical system (this is called "image reformation" because an image of a diffusing light beam having undergone image formation once is formed), and form an image sensor on the image formation plane. A method of inserting a mask (gain modulation element) having an appropriate pattern into an optical path of an imaging operation system can also be used.

(Relationship Between Defocus Amounts and Image Displacement Amounts of Parallax Images)

Figure 8B:
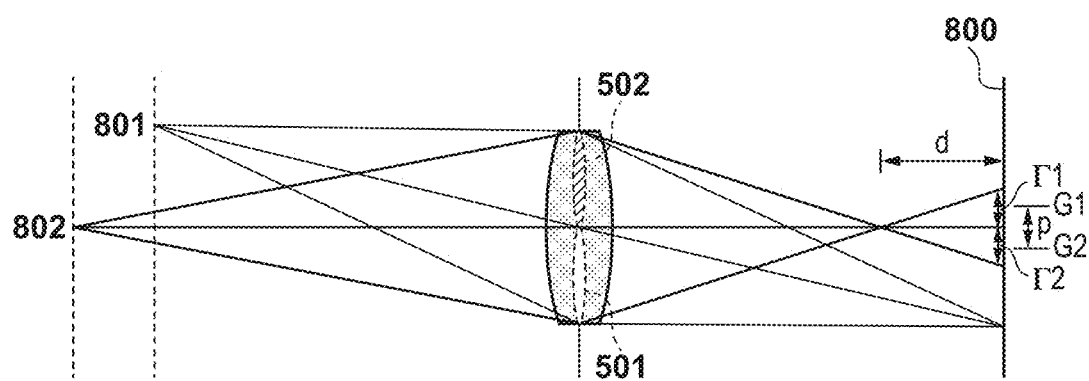
FIG. 8B is a view for explaining the relationship between the defocusing amount and image displacement amount in first and second viewpoint images.

The relationship between the defocus amounts and image displacement amounts of the first and second viewpoint images output from the image sensor 107 will be explained below. FIG. 8B schematically shows the relationship between the defocus amounts of the first and second viewpoint images and the image displacement amounts of the first and second viewpoint images. The image sensor 107 (not shower FIG. 8B) is arranged on the imaging plane 800, and the exit pupil of the image formation optical system is divided into two regions, that is, the pupil partial regions 501 and 502, like FIGS. 5, 8A, and 8B.

Figure 9:
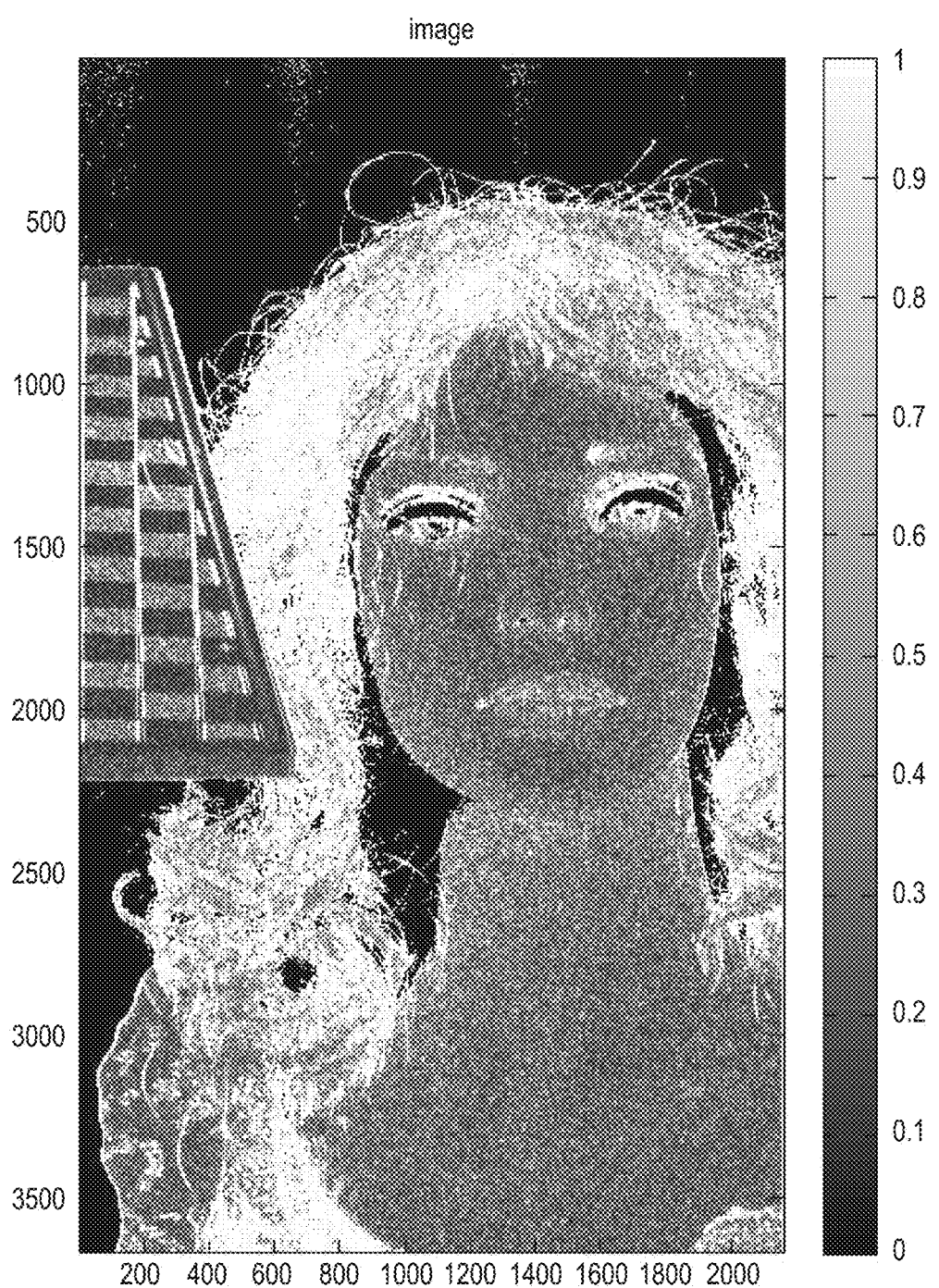
FIG. 9 is a view showing an example of the contrast distribution of a captured image according to the first embodiment.

A defocus amount d represents the distance from the image formation position of an object to the imaging plane 800 by a magnitude |d|. The defocus amount d represents a state in which the image formation position of an object is closer to the object than the imaging plane 800 (this state is also called a front focus state) by a negative sign (d<0). On the other hand, the defocus amount d represents a state in which the image formation position of an object is on the opposite side of the object from the imaging plane 800 (this state is also called a rear focus state) by a positive sign (d>0). An in-focus state in which the image formation position of an object is on the imaging plane is d=0. FIG. 9 shows an example in which an object 801 is in the in-focus state (d=0), and an example in which an object 802 is in the front focus state (d<0). Note that both the front focus state (d<0) and rear focus state (d>0) are defocus states (|d|>0).

In the front focus state (d<0), a light beam which is a part of a light beam from the object 802 and has passed through the pupil partial region 501 (the pupil partial region 502) is condensed once, and expands by a width Γ1 (Γ2) from a gravity center G1 (G2) of the light beam, thereby forming a blurred image on the imaging plane 800. The subpixel 201 (202) forming each pixel arrayed in the image sensor receives this blurred image and generates the first viewpoint image (second viewpoint image). Accordingly, the first viewpoint image (second viewpoint image) is recorded as an object image in which the object 802 is blurred by the width Γ1 (Γ2), in the gravity center G1 (G2) on the imaging plane 800. As the magnitude |d| of the defocus amount d increases, the blur width Γ1 (Γ2) of the object image increases generally proportionally. Likewise, as the magnitude |d| of the defocus amount d increases, a magnitude |p| of an image displacement amount p (=gravity center difference G1−G2 of light beams) of the object image between the first and second viewpoint images increases generally proportionally. The rear focus state (d>0) is the same as the from focus state except that the image displacement direction of the object image between the first and second viewpoint images is opposite to that in the front focus state.

In this embodiment, therefore, the magnitude of the image displacement amount between the first and second viewpoint images increases as the magnitude of the defocus amount of the first and second viewpoint images, or of an imaging signal obtained by adding the first and second viewpoint images, increases.

(Viewpoint Image Correction and Refocusing)

A viewpoint image correcting process and refocusing process according to this embodiment will be explained below. In the first stage of the refocusing process of this embodiment, the viewpoint change processing unit 155 calculates a contrast distribution representing whether the contrast is high or low based on each pixel value of a captured image. In the second stage, based on the calculated contrast distribution, the viewpoint change processing unit 155 performs conversion for emphasizing the parallax by enlarging the difference between a plurality of viewpoint images (the first and second viewpoint images) for each pixel, thereby generating a plurality of corrected viewpoint images (first and second corrected viewpoint images). In the third stage, the refocus processing unit 156 adds the plurality of corrected viewpoint images (the first and second corrected viewpoint images) by relatively shifting them, thereby generating a refocused image.

Note that in the following explanation, assuming that i and j are integers, (j,i) represents the jth position in the row direction and the ith position in the column direction of the image sensor 107. Note also that $A0(j, i)$ represents the first viewpoint image of the pixel in the position (j, i), $B0(j, i)$ represents the second viewpoint image, and $1(j, i)=A0(j, i)+B0(j, i)$ represents the captured image.

(First Stage: Calculation of Contrast Distribution)

The viewpoint change processing unit 155 calculates a luminance $Y(j, i)$ by matching the color gravity centers of RGB in each position (j, i) for the captured image $I(j, i)$ having the Bayer array, in accordance with equation (1).

$$Y(j, i) = [0.25*I(j-1, i-1) + 0.5*I(j-1, i) + 0.25*I(j-1, i+1) + \quad (1)$$
$$0.5*I(j, i-1) + 1.0*I(j, i) + 0.5*I(j, i+1) +$$
$$0.25*I(j+1, i-1) + 0.5*I(j+1, i) + 0.25*I(j+1, i+1)]/4$$

Then, the viewpoint change processing unit 155 applies Laplacian-type filter processing such as [1, 2, −1, −4, −1, 2, 1] to the luminance $Y(j, i)$ in the horizontal direction (column i direction) as the pupil dividing direction, thereby calculating a high-frequency component $dY(j, i)$ in the horizontal direction. The viewpoint change processing unit 155 may also apply, as needed, high-frequency cut filter processing such as [1, 1, 1, 1, 1, 1, 1] in the vertical direction (row j direction) which is not the pupil dividing direction, thereby suppressing high-frequency noise in the vertical direction.

Subsequently, the viewpoint change processing unit 155 calculates a standardized (normalized) horizontal-direction high-frequency component dZ(j, i) in accordance with equation (2). A constant Y0 is added to the denominator in order to prevent the divergence of equation (2) by division by 0. The viewpoint change processing unit 155 may also suppress, as needed, the high-frequency noise by applying the high-frequency cut filter processing to the luminance Y(j, i) before standardization by equation (2).

$$dZ(j,i)=dY(j,i)/(Y(j,i)+Y_0) \quad (2)$$

The viewpoint change processing unit 155 calculates a contrast distribution C(j, i) in accordance with equation (3). The first line of equation (3) shows that the contrast distribution C(j, i) is set to 0 when the luminance of the captured image is lower than a predetermined luminance Yc. On the other hand, the third line of equation (3) shows that the contrast distribution C(j, i) is set to 1 when the standardized high-frequency component dZ(j, i) is larger than a predetermined value Zc. The rest (that is, the second line of equation (3)) shows that a value obtained by standardizing dZ(j, i) by Zc is the contrast distribution C(j, i).

$$C(j, i) = \begin{cases} 0 & (Y(j, i) < Y_c) \\ dZ(j, i)/Z_c & (dZ(j, i) \le Z_c) \\ 1 & (dZ(j, i) > Z_c) \end{cases} \quad (3)$$

The contrast distribution C(j, i) takes a value within the range of [0, 1], and the contrast becomes lower when the value becomes closer to 0, and higher when the value becomes closer to 1.

FIG. 9 shows an example of the contrast distribution C(j, i) of the captured image obtained by equation (3). In this contrast distribution, a white portion indicates that the amount of high-frequency component in the horizontal direction is large and the contrast is high, and a black portion indicates that the amount of high-frequency component in the horizontal direction is small and the contrast is low.

(Second Stage: Process of Emphasizing Parallax of Parallax Image)

The process of emphasizing the parallax of the parallax image will now be explained. In this parallax emphasizing process, the image displacement distribution of the viewpoint image is first calculated. The image displacement distribution can be obtained by performing a correlation calculation on the pair of the first viewpoint image A0 and second viewpoint image B0, thereby calculating a relative positional displacement amount of the pair of images. Various well-known methods of the correlation calculation are available, and the viewpoint change processing unit 155 can obtain the correlation value of the pair of images by adding the absolute value of the difference between the pair of images as indicated the equation (4).

$$k \ge 0 \ COR(k) = \sum_{i}^{ni} |A0_{i+k} - B0_i| \quad (4)$$

$$k < 0 \ COR(k) = \sum_{i}^{ni} |A0_i - B0_{i+k}|$$

where A0*i* and B0*i* respectively represent the luminances of the ith pixels in the first viewpoint image A0 and second viewpoint image B0, and ni is a number representing the number of pixels to be used in the calculation and is properly set in accordance with a minimum calculation range of the image displacement distribution.

For example, the viewpoint change processing unit 155 calculates k which minimizes COR(k) of equation (4) as the image displacement amount. That is, in a state in which the pair of images are shifted by k pixels, the absolute value of the different between the ith A0 pixel and ith B0 pixel in the row direction is calculated, and the absolute values of a plurality of pixels in the row direction are added. Then, the viewpoint change processing unit 155 calculates the shift amount k pixels by regarding the sum, that is, k which minimizes COR(k), as the image displacement amount of A0 and B0.

By contrast, when calculating the difference between the pixel of the first viewpoint image A0 and the second viewpoint image B0 by moving a two-dimensional image by k pixels in only the pupil dividing direction and adding the differences for a plurality of columns, the correlation calculation is defined by equation (5).

$$k \ge 0 \ COR(k) = \sum_{j}^{nj} \sum_{i}^{ni} |A0_{(i+k)j} - B0_{ij}| \quad (5)$$

$$k < 0 \ COR(k) = \sum_{j}^{nj} \sum_{i}^{ni} |A0_{ij} - B0_{(i+k)j}|$$

where A0*ij* and B0*ij* respectively represent the luminances of the ith pixels in the jth columns in the first viewpoint image A0 and second viewpoint image B0, ni represents the number of pixels to be used in the calculation, and nj represents the number of the pairs of images in the column direction as targets of the correlation calculation.

The viewpoint change processing unit 155 calculates k which minimizes COR(k) of equation (5) as the image displacement amount, like equation (4). Note that the subscript k is added to only i and irrelevant to j. This is so because the correlation calculation is performed while moving a two-dimensional image in only the pupil dividing direction. The viewpoint change processing unit 155 can calculate the image displacement distribution by calculating the image displacement amount in each region of the first viewpoint image A0 and second viewpoint image B0 in accordance with equation (5).

A refocusing process (to be described later) of this embodiment is performed by performing sharpness processing (to be described later) on only a high-contrast portion. In the above-described contrast distribution calculation process, therefore, the correlation calculation using equation (5) need not be performed in a region where the contrast distribution C(j, i) is 0 (that is, in a position where the luminance is lower than the predetermined luminance Yc).

A practical example of the parallax emphasizing process will be explained below. As shown in the example of the pupil intensity distribution of FIG. 7, pupil division performed by the microlens and the plurality of divided photoelectric converters formed for each pixel is gentle pupil division due to diffraction blur. Accordingly, in a plurality of viewpoint images corresponding to the gently divided pupil intensity distributions, an effective F value in the pupil dividing direction does not sufficiently darken (increase), an effective depth of focus hardly increases.

In this embodiment, therefore, the viewpoint change processing unit 155 performs a process of emphasizing the parallax by enlarging the difference between a plurality of viewpoint images (the first and second viewpoint images) for each pixel. By this parallax emphasizing process, the viewpoint change processing unit 155 generates a plurality of corrected viewpoint images (first and second corrected viewpoint images).

The viewpoint change processing unit 155 enlarges the difference between the first viewpoint image A0($j$, $i$) and second viewpoint image B0($j$, $i$) in accordance with equations (6) and (7), thereby generating a first corrected viewpoint image A($j$, $i$) and a second corrected viewpoint image B($j$, $i$). In the following equations, k ($0 \leq k \leq 1$) and $\alpha$ ($0 \leq \alpha \leq 1$) are real numbers.

$$A_1(j, i) = k_1 * A_0(j, i) + k_2 * B_0(j, i), \quad (6)$$
$$B_1(j, i) = k_2 * A_0(j, i) + k_1 * B_0(j, i),$$
$$k_1 = \frac{1-k}{1-2k}, k_2 = -\frac{k}{1-2k}$$

$$A(j, i) = \frac{|A_1(j, i)| + A_1(j, i)}{2} + \alpha * \frac{|B_1(j, i)| - B_1(j, i)}{2}, \quad (7)$$
$$B(j, i) = \frac{|B_1(j, i)| + B_1(j, i)}{2} + \alpha * \frac{|a_1(j, i)| - A_1(j, i)}{2}$$

Figure 10:
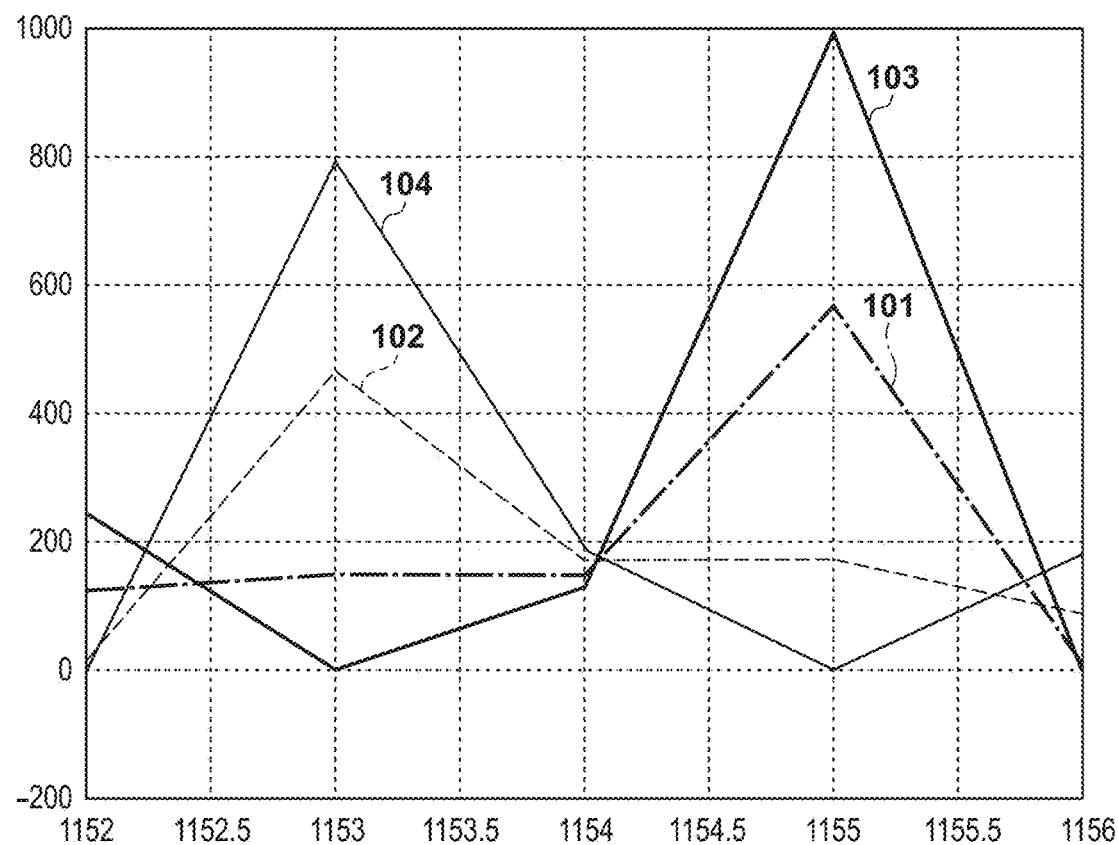
FIG. 10 is a view for explaining an example of parallax emphasis which enlarges the difference between viewpoint images according to the first embodiment.

FIG. 10 shows an example in which the parallax emphasizing process enlarges the difference between viewpoint images in a predetermined position. The broken lines indicate examples of the first viewpoint image A0 (101) and second viewpoint image B0 (102) before the parallax emphasizing process, and the solid lines indicate examples of the first corrected viewpoint image A (103) and second corrected viewpoint image B (104) after the parallax emphasizing process is performed by equations (4) and (5). In FIG. 10, the abscissa indicates the 1152nd to 1156th pixels in units of subpixels, and the ordinate indicates the magnitude of parallax in each pixel. The parallax emphasizing process does not largely change a portion where the difference between the viewpoint images is small (for example, in the vicinity of the 1154th pixel), but enlarges a portion where the difference between the viewpoint images is large (for example, in the vicinities of the 1153rd pixel and 1155th pixel), thereby emphasizing the parallax.

In this embodiment as described above, the viewpoint change processing unit 155 generates, for a plurality of viewpoint images, a plurality of corrected viewpoint images by emphasizing the parallax by enlarging the difference between the plurality of viewpoint images. Note that the viewpoint change processing unit 155 can suppress the load of the parallax emphasizing process by performing the calculation by using signals of a plurality of subpixels included in a pixel.

In equation (6), when parallax emphasis is enhanced by increasing the value of k, the parallax between a plurality of corrected viewpoint images (the first and second corrected viewpoint images) increases. Accordingly, it is possible by increasing the value of k to darken (increase) the effective F value in the dividing direction, and increase the effective depth of focus in the dividing direction by correction.

However, if parallax emphasis is excessively enhanced, noise of the corrected viewpoint images increases, and the S/N decreases.

In this embodiment, therefore, the degree of conversion of parallax emphasis is adjusted in a region adaptive manner based on the contrast distribution C($j$, $i$). For example, the viewpoint change processing unit 155 increases the degree of parallax emphasis by increasing the parallax in a high-contrast region, thereby darkening (increasing) the effective F value in the dividing direction. On the other hand, the viewpoint change processing unit 155 decreases the degree of parallax emphasis in a low-contrast region in order to maintain the S/N, thereby suppressing the decrease in S/N. This makes it possible to increase the parallax between a plurality of corrected viewpoint images (the first and second corrected viewpoint images), darken (increase) the effective F value in the dividing direction, and increase the effective depth of focus in the dividing direction by correction. Also, in the refocusing process to be described later, the refocusing effect can be improved (a change in image by refocusing can be emphasized) by generating a refocused image by using a plurality of corrected viewpoint images (the first and second corrected viewpoint images).

The viewpoint change processing unit 155 can, for example, suppress the decrease in S/N by making, as needed, the degree of parallax emphasis in a high-luminance region of a captured image larger than that in a low-luminance region. Also, it is similarly possible to suppress the decrease in S/N by making, as needed, the degree of parallax emphasis larger in a region of a captured image where the amount of high-frequency component is large than in a region where the amount of high-frequency component is small.

(Third Stage: Refocusing Process)

Figure 11:
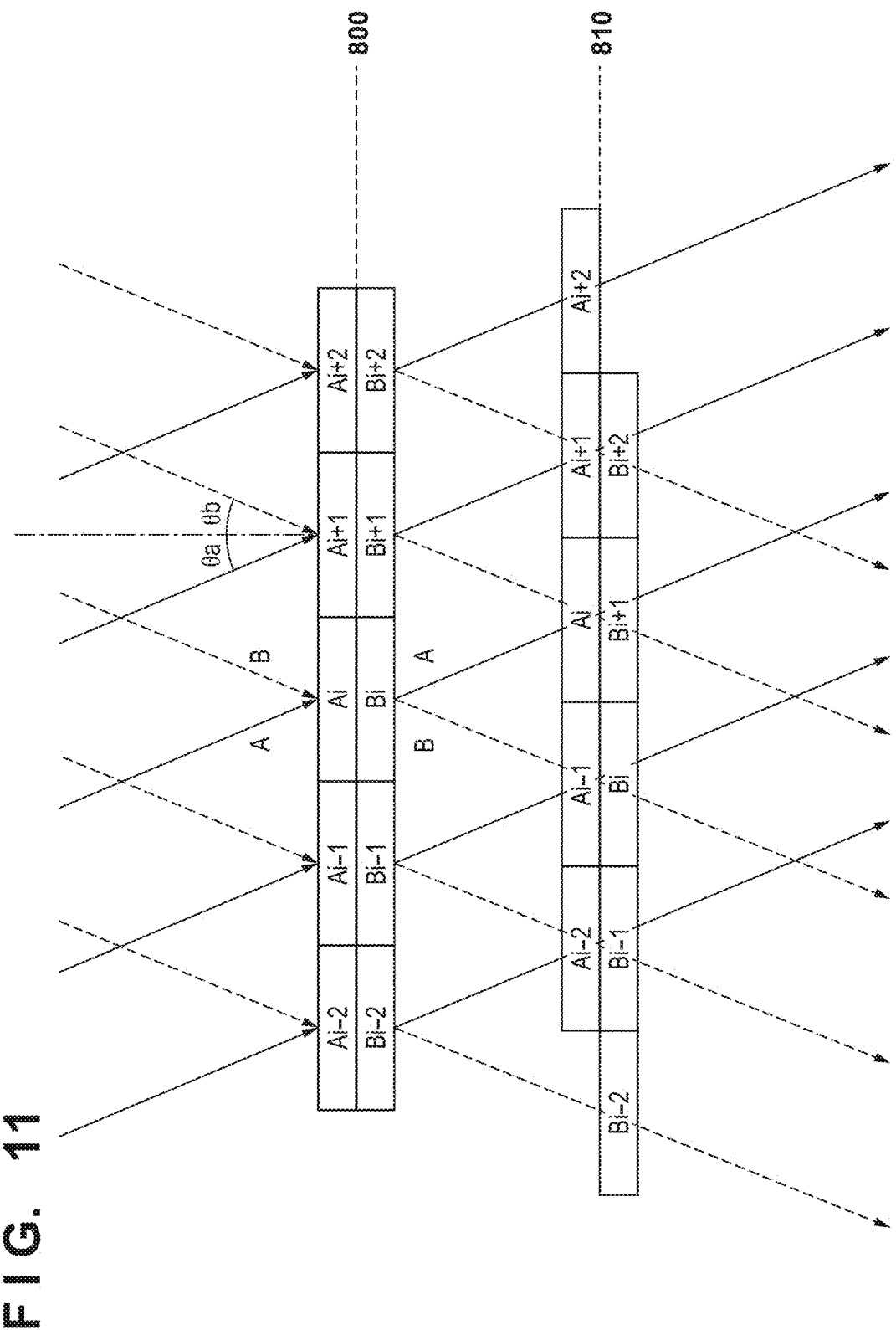
FIG. 11 is a view for explaining an outline of a refocusing process according to the first embodiment.

The refocusing process to be performed in the pupil dividing direction (the column direction or horizontal direction) by using a plurality of corrected viewpoint images (the first and second corrected viewpoint images) will be explained with reference to FIG. 11. FIG. 11 schematically shows a first corrected viewpoint image Ai and a second corrected viewpoint images Bi each containing a signal of the ith pixel in the column direction of the image sensor 107 arranged on the imaging plane 800. The first corrected viewpoint image Ai contains a light reception signal of a light beam entering the ith pixel at a principal ray angle θa (corresponding to the pupil partial region 501 shown in FIG. 8A). The second corrected viewpoint image Bi contains a light reception signal of a light beam entering the ith pixel at a principal ray angle θb (corresponding to the pupil partial region 502 shown in FIG. 8A). That is, the first corrected viewpoint image Ai and second corrected viewpoint image Bi have incident angle information in addition to the light intensity distribution information.

Since the viewpoint image has the incident angle information, the refocus processing unit 156 can generate a refocused image on a predetermined virtual image formation plane. More specifically, the refocus processing unit 156 translates the first corrected viewpoint image Ai and second corrected viewpoint image Bi to a virtual image formation plane 810 along the angle θa and angle θb, respectively. Then, the refocus processing unit 156 can generate a refocused image on the virtual image formation plane 810 by adding the translated corrected viewpoint images pixel by pixel. In this example shown in FIG. 11, translating the first corrected viewpoint image Ai to the virtual image formation plane 810 along the angle θa is equivalent to shifting the first corrected viewpoint image Ai by a +0.5 pixel in the column direction. On the other hand, translating the second corrected viewpoint image Bi to the virtual image formation plane 810 along the angle θb is equivalent to shifting the second corrected viewpoint image Bi by a −0.5 pixel in the column direction. That is, in this example shown in FIG. 11, a combination of the first corrected viewpoint image Ai and second corrected viewpoint image Bi on the virtual image formation plane 810 is obtained by relatively shifting the first corrected viewpoint image Ai and second corrected viewpoint image Bi by a +1 pixel. This makes it possible to generate a refocused image on the virtual image formation plane 810 by adding the first corrected viewpoint image Ai and a shifted second corrected viewpoint image Bi+1 pixel by pixel.

Thus, the refocus processing unit 156 adds the first corrected viewpoint image A and second corrected viewpoint image B by shifting them in accordance with equation (8) by using an integral shift amount s, thereby generating a refocused image I(j, i;s) on each virtual image formation plane corresponding to the integral shift amount s.

$$I(j,i;s)=A(j,i)+B(j,i+s) \quad (8)$$

In this embodiment, the first corrected viewpoint image A and second corrected viewpoint image B are formed by the Bayer array, so the refocus processing unit 156 performs shift addition in accordance with equation (8) for each color by using shift amount s=2n (n: an integer) which is a multiple of 2. That is, the refocus processing unit 156 generates the refocused image I(j, i;s) while holding the Bayer array of the image, and performs a demosaicing process on the generated refocused image I(j, i;s) after that. Note that the refocus processing unit 156 may also perform, as needed, the demosaicing process on the first corrected viewpoint image A and second corrected viewpoint image B, and perform the shift addition process by using the demosaiced first and second corrected viewpoint images after that. Furthermore, the refocus processing unit 156 may also generate, as needed, interpolation signals between pixels in the first corrected viewpoint image A and second corrected viewpoint image B, and generate a refocused image corresponding to a non-integral shift amount. This makes it possible to generate a refocused image by changing the position of the virtual image formation plane with finer granularity.

Next, sharpness processing which the refocus processing unit 156 applies to generate a more effective refocused image and the calculation of a refocusing enable range will be explained.

(Sharpness Processing)

In the refocusing process as described above, a refocused image on the virtual image formation plane is generated by adding the first corrected viewpoint image A and second corrected viewpoint image B by shifting them. Since the first and second corrected viewpoint images A and B are shifted by the shift addition, a relative shift amount (also called an image shift amount) of an image before the refocusing process is known.

The integral shift amount s in the above-described refocusing process corresponds to this image shift amount. Therefore, the refocus processing unit 156 can emphasize the contour of an object in the refocused image by performing the sharpness processing on a region corresponding to the image shift amount s.

Figure 12:
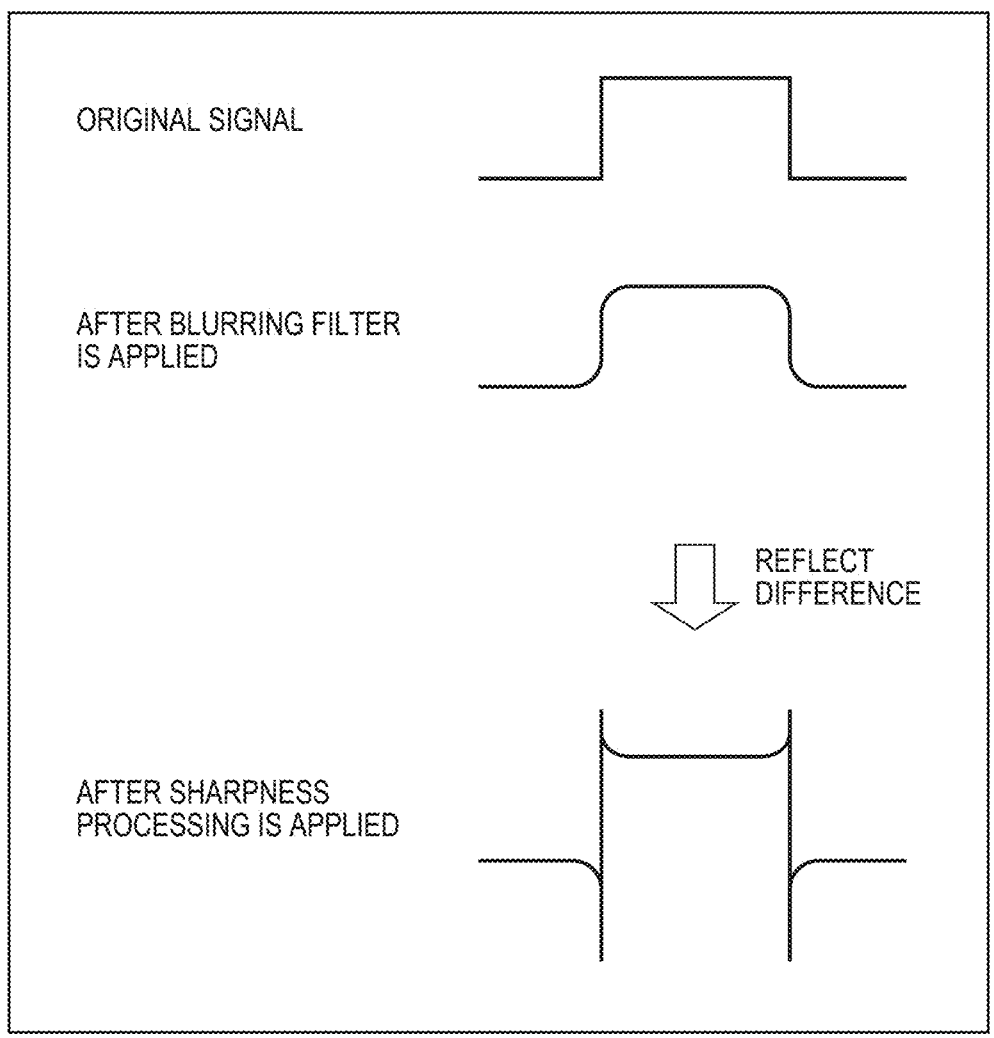
FIG. 12 is a view for explaining an outline of unsharpness processing according to the first embodiment.

The sharpness processing according to this embodiment uses unsharp mask processing an outline of which is shown in FIG. 12. In this unsharp mask processing, a blurring filter is applied to a local region (original signal) around a pixel of interest, and the difference between pixel values before and after a blurring process is applied is reflected on the pixel value of the pixel of interest, thereby implementing edge enhancement.

The unsharp mask processing for the pixel value P to be processed is calculated in accordance with equation (9). Note that P′ is a pixel value after the processing is applied, R is the radius of the blurring filter, and T is an application amount (%).

$$P'(i,j)=P(i,j)+(P(i,j)-F(i,j,R)) \times T(i,j)/100 \quad (9)$$

In equation (9), F(i, j, R) is a pixel value obtained by applying the blurring filter having the radius R to the pixel P(i, j). Note that a well-known method such as Gaussian blur can be used in the blurring filter. Gaussian blur is a process of averaging by applying weighting corresponding to a Gaussian distribution in accordance with the distance from a pixel to be processed, and capable of obtaining a natural processing result. Also, the radius R of the blurring filter is related to the wavelength of a frequency on an image to which the sharpness processing is to be applied. That is, fine patterns are emphasized as R decreases, and moderate patterns are emphasized as R increases. The application amount T(i, j) is a value which changes the application amount of edge enhancement by the unsharp mask processing in accordance with the image displacement distribution. More specifically, letting pred(i, j) be the image displacement amount in the position of each pixel and the shift amount s by the refocusing process, the application amount T is increased in a region where s pred(i, j) has a small value (for example, image displacement is one pixel or less), that is, a region where an in-focus state is obtained on the virtual image formation plane. On the other hand, the application amount T is decreased in a region where |s−pred(i, j)| has a large value (for example, the image displacement amount is three pixels or more). This makes it possible to emphasize the contour in a region having a small defocus amount and close to the focus position or in-focus position, and perform no unsharp mask processing (or no blurring process) on a blurred region having a large defocus amount. That is, it is possible to more enhance the effect of moving the focus position by the refocusing process.

(Calculation of Refocusing Enable Range)

Figure 13:
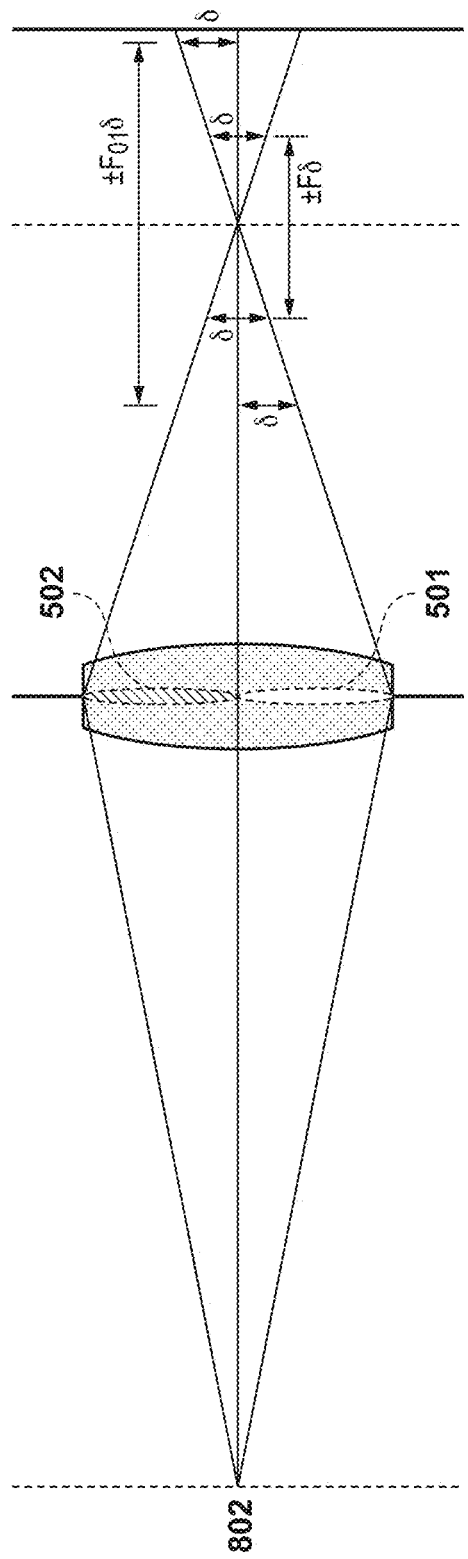
FIG. 13 is a view for explaining a refocusing enable range according to the first embodiment.

A refocusing enable range represents the range of the focus position changeable by the refocusing process. For example, FIG. 13 schematically shows the refocusing enable range according to this embodiment. Letting δ be a permissible circle of confusion and F be the aperture value of the image formation optical system, the depth of field at the aperture value F is ±Fδ. By contrast, an effective aperture value F01 (F02) in the horizontal direction of the pupil partial region 501 (502) narrowed by being divided by NH×NV (2×1) is as dark as F01=NHF. An effective depth of field of each first corrected viewpoint image (second corrected viewpoint image) is ±NHFδ, that is, is increased by NH times, and the in-focus range is widened by NH times. That is, a focused object image is obtained for each first corrected viewpoint image (second corrected viewpoint image) within the range of effective depth of field ±NHFδ. Therefore, the refocus processing unit 156 can readjust (refocus) the focus position after imaging by the refocusing process of translating the first corrected viewpoint image (second corrected viewpoint image) along the principal ray angle θa (θb) shown in FIG. 11. In other words, the defocus amount d from the imaging plane by which the focus position can be readjusted (refocused) after imaging is limited, and the refocusing enable range of the defocus amount d is generally the range of equation (10).

$$|d| \leq N_H F \delta \qquad (10)$$

The permissible circle of confusion δ is defined by, for example, δ=2ΔX (the reciprocal of 1/(2ΔX) as a Nyquist frequency having a pixel period ΔX). By thus calculating the refocusing enable range, the refocusing enable range can be associated with an operable range when the focus position is changed (refocused) by a user operation. Also, a ray of light (object) which can be focused by the refocusing process can be grasped in advance. Therefore, it is possible, for example, to perform imaging again by controlling the imaging conditions such as the state of the image formation optical system, so that the refocusing enable range includes a predetermined object.

(Viewpoint Moving Process)

A viewpoint moving process according to this embodiment which is executed by the viewpoint change processing unit 155 will be explained below. Note that this viewpoint moving process is a process which reduces a blur of a non-main object on the near side if this blur of the non-main object overlaps a main object.

Figure 14A:
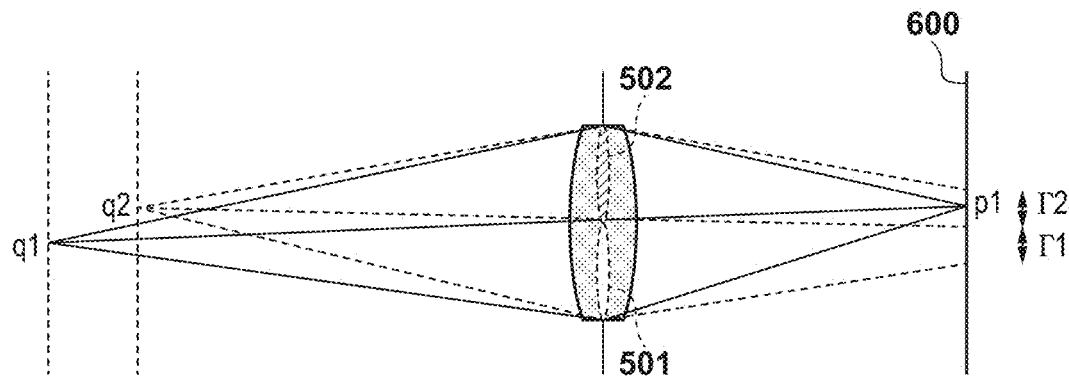
FIGS. 14A, 14B, and 14C are views for explaining the principle of a viewpoint moving process according to the first embodiment.
Figure 14B:
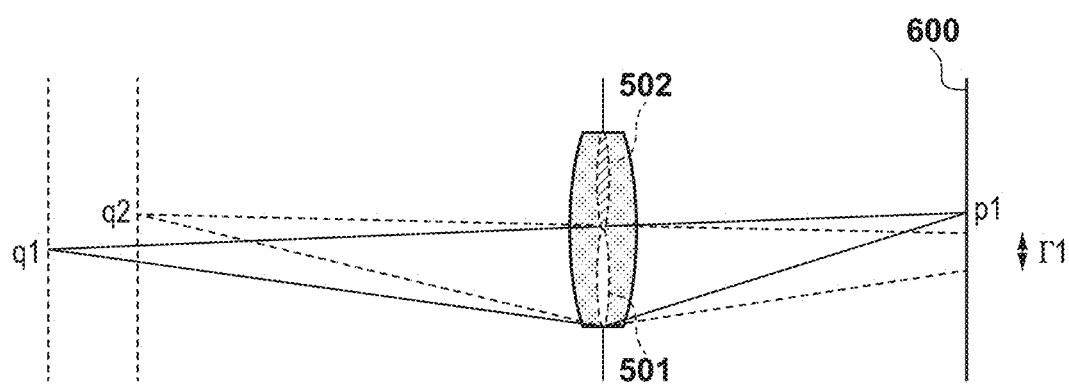
Figure 14C:
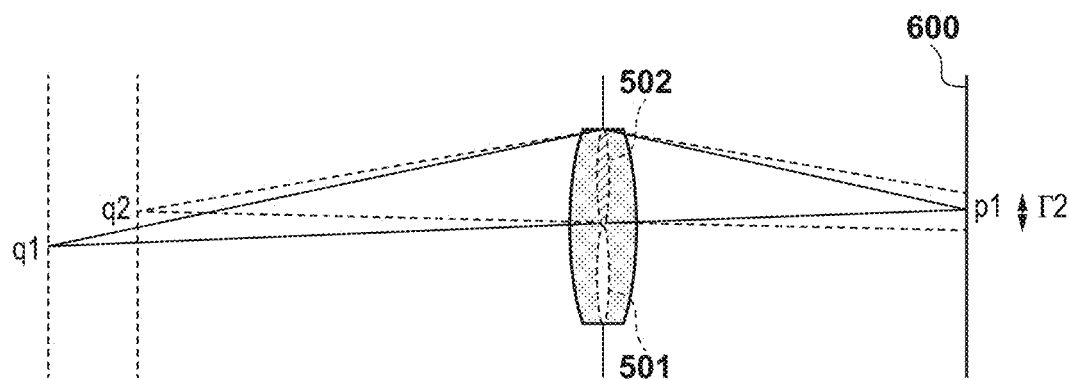

FIGS. 14A to 14C show the principle of the viewpoint moving process. In FIGS. 14A to 14C, the image sensor 107 (not shown) is placed on an imaging plane 600, and the exit pupil of the image formation optical system is divided into two, that is, the pupil partial regions 501 and 502 as in FIG. 11.

FIG. 14A shows an example of a case in which blurred images Γ1+Γ2 of an object q2 on the near side are so captured as to overlap a focused image p1 of a main object q1 (this is also called front blur overlap to the main object). FIGS. 14B and 14C respectively illustrate the example shown in FIG. 14A, by a light beam passing through the pupil partial region 501 of the image formation optical system, and a light beam passing through the pupil partial region 502. In FIG. 14B, the light beam from the main object q1 passes through the pupil partial region 501 and forms the image p1 in the in-focus state. On the other hand, the light beam from the object q2 on the near side passes through the pupil partial region 501 and expands into the blurred image Γ1 in the defocused state. The suhpixels 201 of different pixels in the image sensor 107 receive these light beams, and generate a first viewpoint image. In this first viewpoint image as shown in FIG. 14B, the image p1 of the main object q1 and the blurred image Γ1 of the object q2 on the near side are received without any overlap. This is one of a plurality of viewpoint images (the first viewpoint image and a second viewpoint image), in which the object on the nearest side (the blurred image Γ1 of the object q2) is imaged in the narrowest range, in a predetermined region (the vicinity of the image p1 of the object q1). In other words, one of the plurality of viewpoint images (the first and second viewpoint images), in which the appearance of the blurred image Γ1 of the object q2 is small and the contrast evaluation value is largest, is obtained in the predetermined region (the vicinity of the image p1 of the object q1).

On the other hand, in FIG. 14C, the light beam from the main object q1 passes through the pupil partial region 502 and forms the image p1 in the in-focus state. On the other hand, the light beam from the object q2 on the near side passes through the pupil partial region 502 and expands into the blurred image Γ2 in the defocused state. The subpixels 202 of pixels in the image sensor 107 receive these light beams, and generate the second viewpoint image. In the second viewpoint image as shown in FIG. 14C, the image p1 of the main object q1 and the blurred image Γ2 of the object q2 on the near side are received as they are overlapped. This is one of the plurality of viewpoint images (the first and second viewpoint images), in which the object on the nearest side (the blurred image Γ2 of the object q2) is imaged in the broadest range, in the predetermined region (the vicinity of the image p1 of the object q1). In other words, one of the plurality of viewpoint images (the first and second viewpoint images), in which the appearance of the blurred image Γ2 of the object q2 is large and the contrast evaluation value is smallest, is obtained in the predetermined region (the vicinity of the image p1 of the object q1).

Accordingly, the front blur overlap to the main object can be reduced by performing addition by increasing the weight of the first viewpoint image in which the overlap of the image p1 and blurred image Γ1 is small, and decreasing the weight of the second viewpoint image in which the overlap of the image p1 and the blurred image Γ2 is large, in the vicinity of the image p1.

Processing by which the viewpoint change processing unit 155 superposes the first and second viewpoint images by using the weights will be explained below. Note that the viewpoint change processing unit 155 receives the first viewpoint image A(j, i) and second viewpoint image B(j, i) described above.

In the first step, the viewpoint change processing unit 155 sets predetermined region R=[j1, j2]×[i1, i2] as a target of viewpoint movement and a boundary width σ of the predetermined region, and calculates a table function T(j, i) corresponding to the predetermined region R and the boundary width σ of the predetermined region in accordance with equation (11).

$$T(j, i) = 0.5 * \left[\tanh\frac{(j-j_1)}{\sigma} - \tanh\frac{(j-j_2)}{\sigma}\right] \times \qquad (11)$$
$$0.5 * \left[\tanh\frac{(i-i_1)}{\sigma} - \tanh\frac{(i-i_2)}{\sigma}\right]$$

Note that the table function T(j, i) is a function which is 1 inside the predetermined region R and 0 outside the predetermined region R, and generally continuously changes from 1 to 0 by the boundary width σ of the predetermined region R. Note that the viewpoint change processing unit 155 may also set a circle or another arbitrary shape as the predetermined region, and set a plurality of predetermined regions and a plurality of boundary widths.

In the second step, the viewpoint change processing unit 155 calculates a first weighting coefficient Wa(j, i) of the first viewpoint image A(j, i) in accordance with equation (12A) by using a real coefficient w(−1≤w≤1). In addition, the viewpoint change processing unit 155 calculates a second weighting coefficient Wb(j, 1) of the second viewpoint image B(j, i) in accordance with equation (12B).

$$W_a(j,i)=1-wT(j,i), \qquad (12A)$$

$$W_b(j,i)=1+wT(j,i) \qquad (12B)$$

In the third step, the viewpoint change processing unit 155 generates an output image I(j, i) in accordance with equation (13) by using the first viewpoint image A(j, i), second viewpoint image B(j, i), first weighting coefficient Wa(j, i), and second weighting coefficient Wb(j, i).

$$I(j,i)=W_a(j,i)*A(j,i)+W_b(j,i)*B(j,i). \qquad (13)$$

Alternatively, the viewpoint change processing unit 155 may also generate an output image Is(j, i) in accordance with equation (14A) or (14B) by combining this process and the refocusing process using the shift amount s.

$$I_s(j,i)=W_a(j,i)*A(j,i)+W_b(j,i)*B(j,i+s),\quad(14A)$$

$$I_s(j,i)=W_a(j,i)*A(j,i)+W_b(j,i+s)*B(j,i+s)\quad(14B)$$

The output image Is(j,i) thus output is an image for which the viewpoint has moved, and an image for which the focus position is readjusted (refocused).

As described above, an output image is generated by synthesizing the plurality of viewpoint images by multiplying each viewpoint image by the weighting coefficient which continuously changes in accordance with a region of the output image. That is, when reducing the front blur overlap to the main object by using equation (13), the viewpoint change processing unit 155 generates an output image by making the first weighting coefficient Wa of the first viewpoint image in which the overlap of the image p1 and blurred image Γ1 is small larger than the second weighting coefficient Wb of the second viewpoint image in which the overlap of the image p1 and blurred image Γ2 is large, in the vicinity of the image p1.

In other words, in a predetermined region of an image, the viewpoint change processing unit 155 minimizes the weighting coefficient of a viewpoint image in which an object on the nearest side is imaged in the broadest range, or maximizes the weighting coefficient of a viewpoint image in which the object on the nearest side is imaged in the narrowest range. Also, in a predetermined region of an output image, the viewpoint change processing unit 155 minimizes the weighting coefficient of a viewpoint image in which the contrast evaluation value is smallest, or maximizes the weighting coefficient of a viewpoint image in which the contrast evaluation value is largest.

Note that in a region which is not the predetermined region and in which the viewpoint moving process is not performed, the viewpoint change processing unit 155 may also generate an output image by generally equally adding the weighting coefficients (the first and second weighting coefficients) of a plurality of viewpoint images, so as not to change the blurred shape of the image formation optical system. Note also that a method of generating an output image by changing the weighting coefficient (that is, the addition ratio) in accordance with user's designation will be described later, but the user may also designate a predetermined region where the viewpoint moving process is to be performed.

(Viewpoint Moving Process For Pupil Displacement)

Figure 15A:
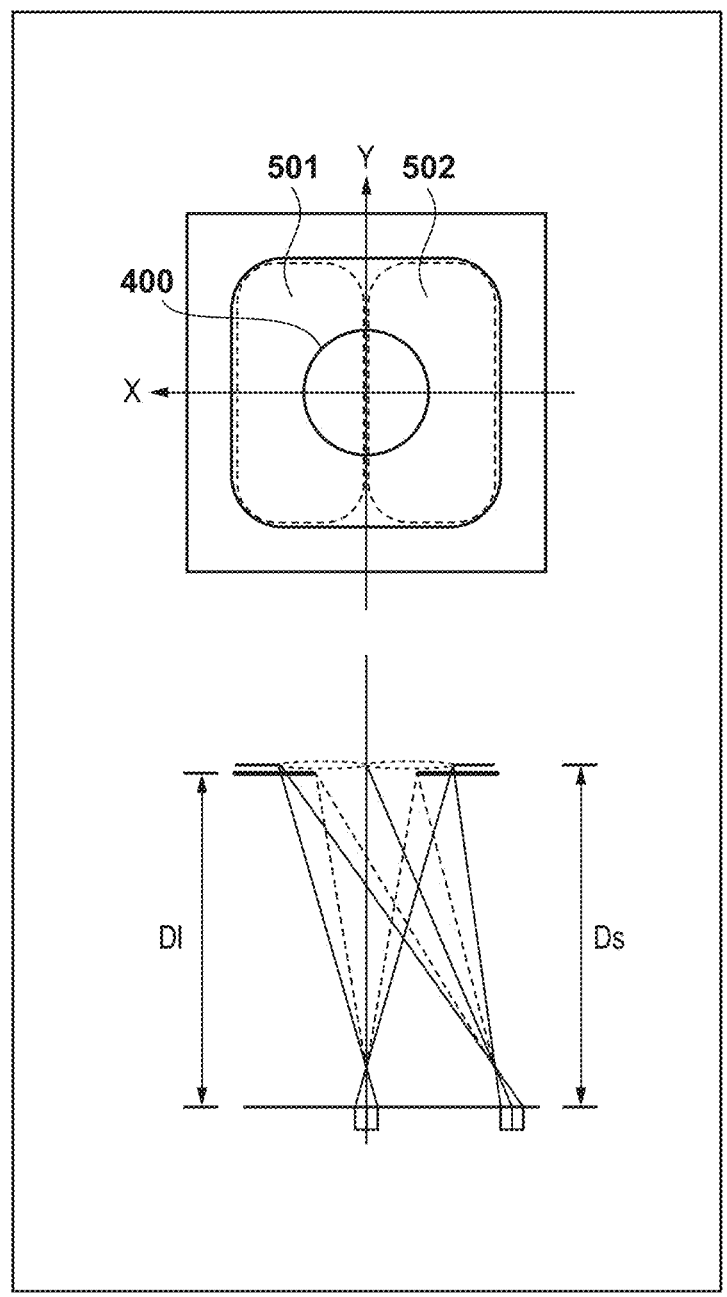
FIGS. 15A, 15B, and 15C are views for explaining a pupil displacement at a peripheral image height of the image sensor according to the first embodiment.
Figure 15B:
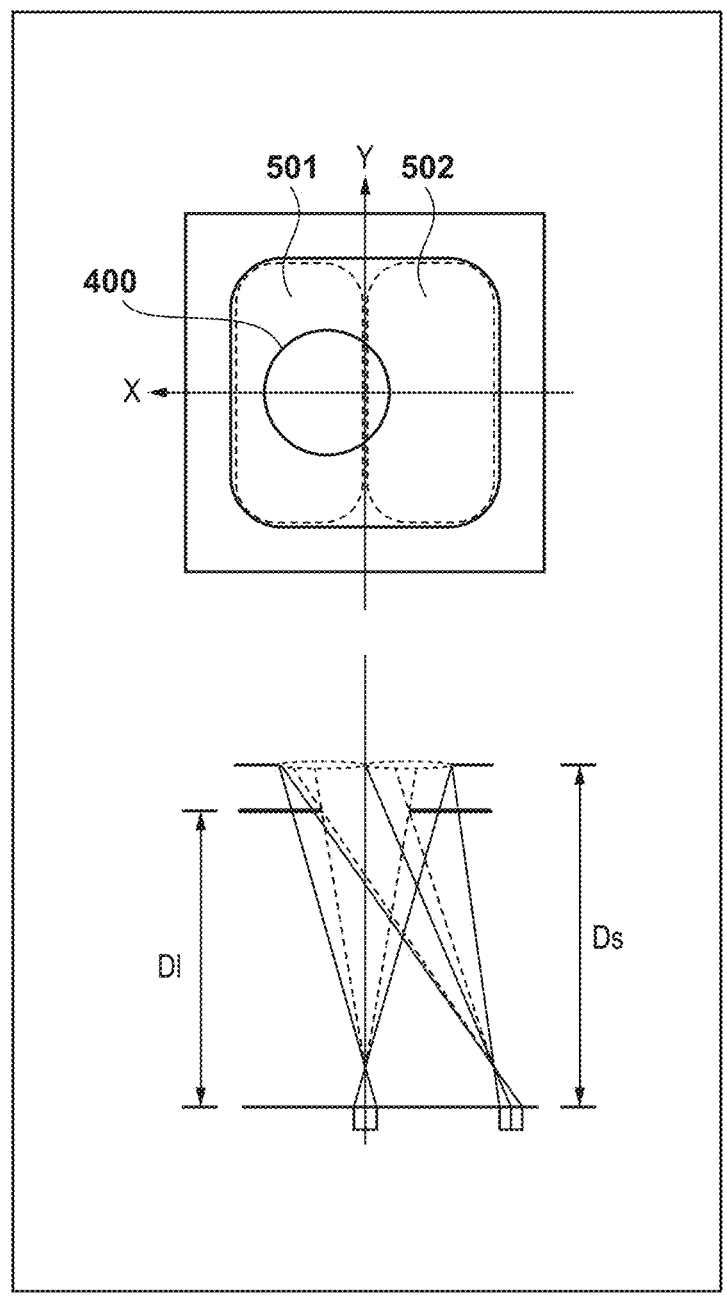
Figure 15C:
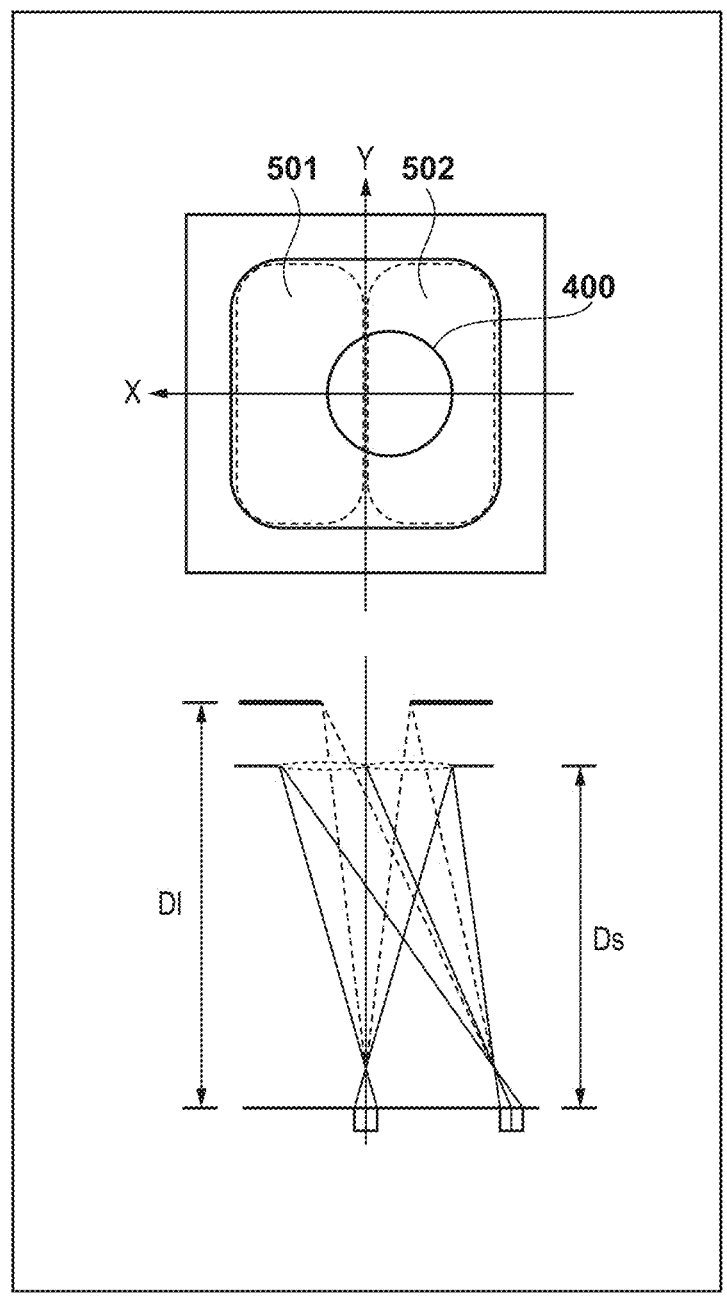

A pupil displacement at the peripheral image height of the image sensor 107 will be explained below. FIGS. 15A to 15C each illustrate the relationship between the pupil partial regions (501, 502) where the subpixels 201 and 202 of each pixel receive light and an exit pupil 400 of the image formation optical system.

FIG. 15A shows a case in which an exit pupil distance D1 of the image formation optical system and a set pupil distance Ds of the image sensor 107 are the same. In this case, the exit pupil 400 of the image formation optical system is generally equally divided by the pupil partial regions 501 and 502 at both the central image height and peripheral image height.

FIG. 15B shows a case in which the exit pupil distance D1 of the image formation optical system is shorter than the set pupil distance Ds of the image sensor 107. In this case, the exit pupil 400 of the image formation optical system is unequally divided by the pupil partial regions 501 and 502 at the peripheral image height. In this example shown in FIG. 15B, the effective aperture value of the first viewpoint image corresponding to the pupil partial region 501 is smaller (brighter) than that of the second viewpoint image corresponding to the pupil partial region 502. At an image height on the opposite side (not shown), the effective aperture value of the first viewpoint image corresponding to the pupil partial region 501 is larger (darker) than that of the second viewpoint image corresponding to the pupil partial region 502.

FIG. 15C shows a case in which the exit pupil distance D1 of the image formation optical system is longer than the set pupil distance Ds of the image sensor 107. At the peripheral image height, the exit pupil 400 of the image formation optical system is unequally divided by the pupil partial regions 501 and 502 in this case as well. In this example shown in FIG. 15C, the effective aperture value of the first viewpoint image corresponding to the pupil partial region 501 is larger (darker) than that of the second viewpoint image corresponding to the pupil partial region 502. At an image height on the opposite side (not shown), the effective aperture value of the first viewpoint image corresponding to the pupil partial region 501 is smaller (brighter) than that of the second viewpoint image corresponding to the pupil partial region 502.

That is, as pupil division becomes unequal at the peripheral image height due to pupil displacement, the effective f-numbers of the first and second viewpoint images also become unequal. Consequently, the expansion of the blur of one of the first and second viewpoint images increases, and that of the other decreases.

Accordingly, in a predetermined region of an output image, the viewpoint change processing unit 155 desirably minimizes the weighting coefficient of a viewpoint image having the smallest effect aperture value, and maximizes the weighting coefficient of a viewpoint image having the largest effective aperture value, as needed. The front blur overlap to the main object can be reduced by performing the viewpoint moving process as described above.

(Depth of Field Extending Process)

A depth extending process by the viewpoint change processing unit 155 will be explained below by referring to FIG. 14B again. In FIG. 14B as described above, an image having passed through the pupil partial region 501 is the first viewpoint image, and an image having passed through the pupil partial region 502 is the second viewpoint image. Since each viewpoint image is an image obtained by being passed through the half of the original pupil partial region as shown in FIG. 14, the aperture diameter in the horizontal direction becomes half when the pupil partial region is divided into two in the horizontal direction. Consequently, the depth of field in the horizontal direction becomes four times. On the other hand, pupil division is not performed in the vertical direction in this embodiment, so the depth of field in the vertical direction remains unchanged. Accordingly, the first or second viewpoint image becomes an image having a double depth of field on average in the horizontal and vertical directions with respect to the depth of field of an image (A+B image) obtained by synthesizing the first and second viewpoint images.

As described above, the viewpoint change processing unit 155 can generate an image having an extended depth of field by generating a synthetic image by changing the addition ratio of the first or second viewpoint image to a value other than 1:1. In addition, the viewpoint change processing unit 155 applies the unsharp mask processing using the above-described contrast distribution and image displacement distribution to the image obtained by changing the addition ratio of the first or second viewpoint image. This makes it possible to extend the depth of field, and generate a synthetic image having an emphasized contour, in this depth extending process, a predetermined region may also be processed in accordance with user's designation, as in the viewpoint moving process. Note that when the synthetic image from the viewpoint images is output from the viewpoint change processing unit 155, the developing process described earlier is applied to the image, and the image processor 125 outputs the developed image.

(Series of Operations of Viewpoint Movement and Focus Adjustment For Captured Image)

Figure 16:
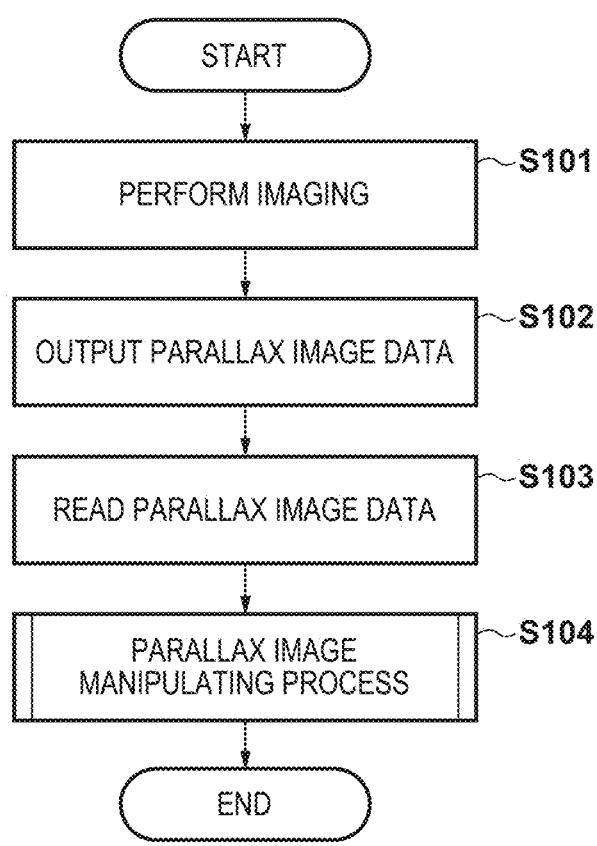
FIG. 16 is a flowchart showing a series of operations according to a viewpoint moving operation and focus adjusting operation on a captured image according to the first embodiment.

A series of operations of viewpoint movement and focus adjustment for a captured image will be explained below with reference to FIG. 16. Note that this process is started when the user presses a release switch or the like included in the operation unit 132. Note also that this process is implemented by the controller 121 by loading a program stored in the ROM (not shown) into a work area of the RAM, executing the program, and controlling each unit of the image processor 125 and the like.

In step S101, the image sensor 107 performs imaging in accordance with an instruction of the controller 121. In step S102, the image sensor 107 outputs parallax image data. More specifically, the image sensor 107 outputs the above-described viewpoint images (the A+B image and A image) as image data having one file format. Also, the recording medium 133 temporarily stores the image data output from the image sensor 107.

In step S103, the image processor 125 reads the parallax image data in accordance with an instruction of the controller 121. For example, the image processor 125 obtains the image data stored in the recording medium 133 by using the image obtaining unit 151. In this step, the image processor 125 generates the B image from the A+B image, and obtains, for example, the first viewpoint image (A image) as an image having the left-side viewpoint, and the second viewpoint image (B image) as an image having the right-side viewpoint. In step S104, the controller 121 performs a viewpoint image manipulating process (to be described later), that is, performs viewpoint movement and focus adjustment on the captured image by controlling the operation unit 132 and the output from the image processor 125. The controller 121 terminates the series of processes when completing the viewpoint image manipulating process.

(Series of Operations of Viewpoint Image Manipulating Process)

Figure 17:
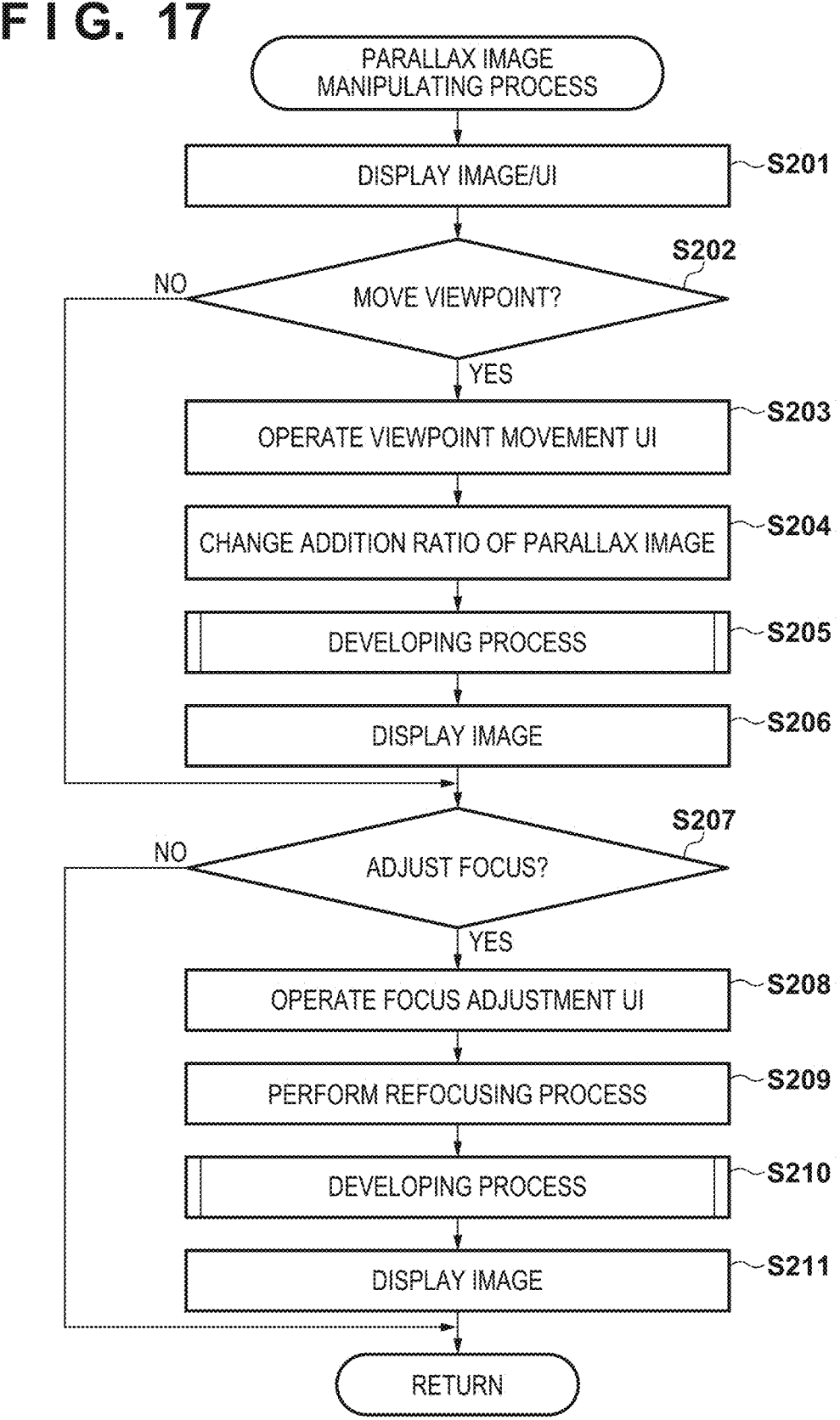
FIG. 17 is a flowchart showing a series of operations of a viewpoint image manipulating process according to the first embodiment.

A series of operations of the viewpoint image manipulating process in step S104 will be explained below with reference to a flowchart shown in FIG. 17, Note that an example in which operations on a user interface (a viewpoint movement UI) for performing viewpoint movement (and a change of the depth of field) are performed before operations on a user interface (a focus adjustment UI) for performing focus adjustment will be explained below. However, the focus adjustment UI operations may also be performed before the viewpoint movement UI operations.

In step S201, the controller 121 causes the display unit 131 to display a user interface (to be simply referred to as a UI) including the viewpoint movement UI and focus adjustment UI, and a captured image.

In step S202, the controller 121 determines whether to perform viewpoint movement based on a user operation input via the operation unit 132. If the input user operation indicates the execution of viewpoint movement, the controller 121 determines to perform viewpoint movement, and advances the process to step S203. On the other hand, if the input user operation does not indicate the execution of viewpoint movement, the controller 121 determines not to perform viewpoint movement, and advances the process to step S207.

Figure 19A:
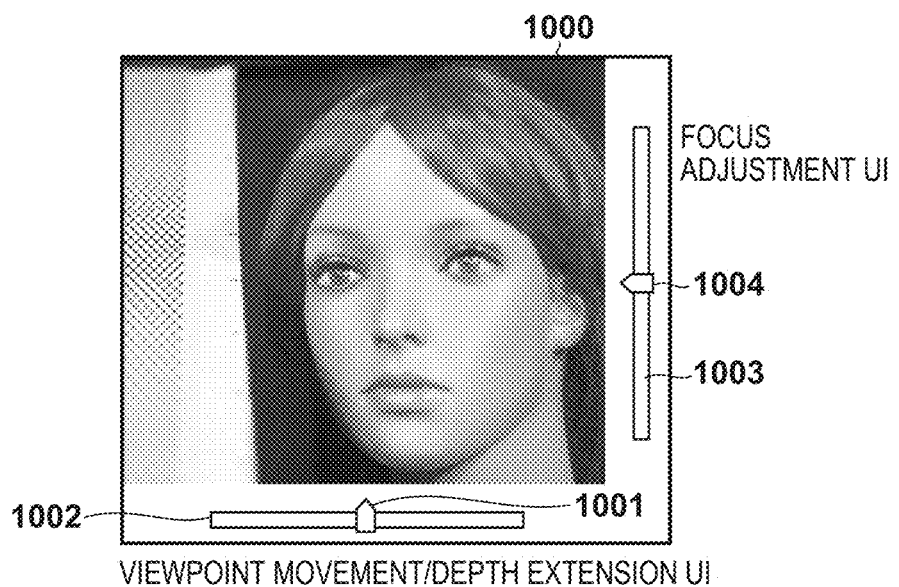
FIGS. 19A, 19B, 19C, and 19D are views schematically showing a viewpoint movement UI and focus adjustment UI according to the first embodiment.

In step S203, the controller 121 further obtains a user operation of operating the viewpoint movement UI via the operation unit 132. FIG. 19A shows an example of the viewpoint movement UI to be displayed on the display unit 131. In this example shown in FIG. 19A, an image (a captured image or viewpoint image) is displayed in a partial region 1000 forming the UI. Since an image for which the pupil is divided into two in the horizontal direction is obtained in this embodiment as described earlier, a viewpoint image is generated by using only the left and right viewpoint images.

The viewpoint movement UI displays a slider 1001 and a slider bar 1002 in the horizontal direction so that the user can operate an operating member in the viewpoint changing direction. This allows the user to operate viewpoint movement more intuitively.

In step S204, the controller 121 generates a synthetic image by changing the addition ratio of the viewpoint images by using the image processor 125. More specifically, the image processor 125 obtains the position of the slider 1001 designated in step S203 via the operation information obtaining unit 154. The image processor 125 synthesizes the first and second viewpoint images by changing the addition ratio of these images in accordance with the position of the slider 101 (that is, performs a viewpoint moving process), thereby generating an image having the moved viewpoint. Defining that the value at the right end of the slider bar 1002 is 1, the value at the center is 0, and the value at the left end is −1, the image processor 125 changes the addition ratio such that the ratio of the first and second viewpoint images is (1+x):(1−x), when the slider 1001 exists in a position x.

In step S205, the controller 121 applies a developing process on the image synthesized in step S204 by using the image processor 125. This developing process will be described later with reference to a flowchart shown in FIG. 18. In step S206, the controller 121 displays the image developed in step S205 on the display unit 131.

In step S207, the controller 121 determines whether to perform focus adjustment based on a user operation input via the operation unit 132. If the input user operation indicates the execution of focus adjustment, the controller 121 determines to perform focus adjustment, and advances the process to step S208. On the other hand, if the input user operation does not indicate the execution of focus adjustment, the controller 121 determines not to perform focus adjustment, and terminates the series of processes.

In step S208, the controller 121 further obtains a user operation of operating the focus adjustment UI via the operation unit 132. FIG. 19A shows an example of the focus adjustment UI. The slider bar is set in the viewpoint moving direction in the above-described viewpoint movement UI, whereas a slider bar is set in a direction (at an angle) different from that of viewpoint movement in the focus adjustment UI. In this example shown in FIG. 19A, a slider bar 1003 and a slider 1004 of the focus adjustment UI are set in a direction (that is, the vertical direction) perpendicular to the direction of the slider bar 1002 of the viewpoint movement UI. For example, when the slider 1004 is moved up, the controller 121 controls focus adjustment in a direction in which a rear focus state becomes strong. When the slider 1004 is moved down, the controller 121 controls focus adjustment in a direction in which a front focus state becomes strong. A focus adjustment range is equivalent to the above-described refocusing enable range, and calculated in accordance with equation (10).

In step S209, the controller 121 calculates the focus adjustment position and performs the above-described refocusing process based on the slider position designated in step S208 by using the image processor 125. The image processor 125 decides a defocus amount (or shift amount) corresponding to the refocus enable range based on the position of the slider 1004 on the slider bar 1002. In step S2110, the controller 121 performs the developing process by using the image processor 125. Then, in step S211, the controller 121 causes the display unit 131 to display the developed image, terminates the series of operations of the parallax image manipulating process, and returns the processing to the caller.

(Series of Operations of Developing Process)

Figure 18:
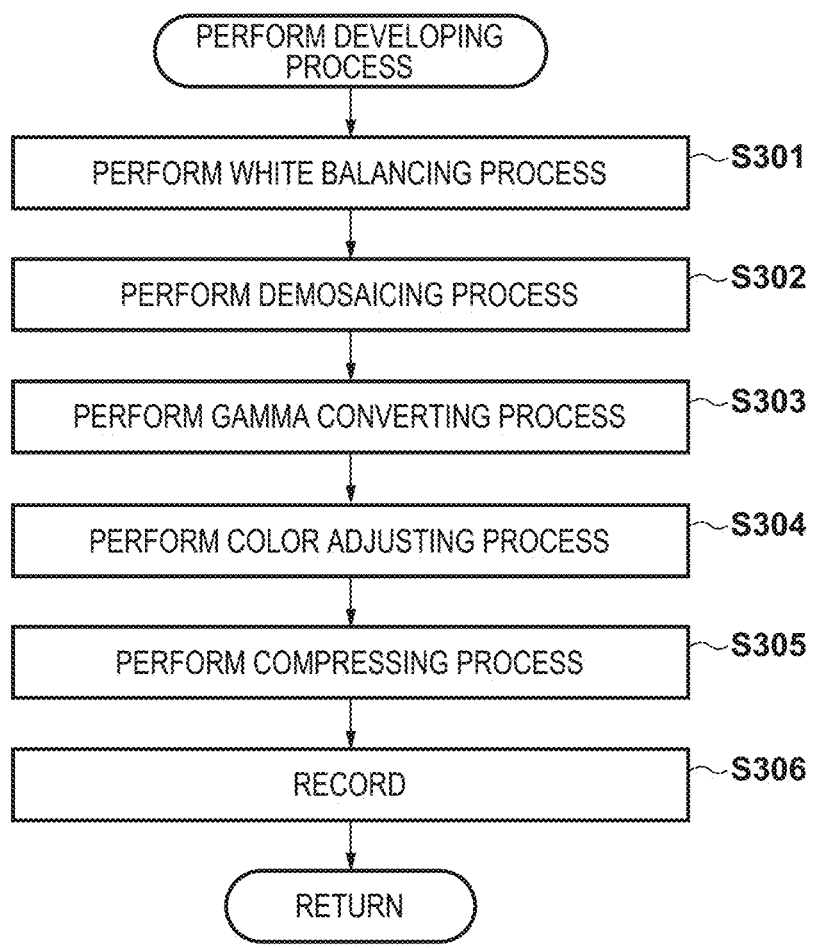
FIG. 18 is a flowchart showing a series of operations of a developing process according to the first embodiment.

The developing process in steps S205 and S210 will now be explained with reference to FIG. 18. In step S301, the image processor 125 performs a white balancing process by applying gains to R, G, and B so that R, G, and B become equal colors in a white region. In step S302, the image processor 125 performs a demosaicing process. More specifically, the image processor 125 performs interpolation on input images in respective defined directions, and selects a direction after that, thereby generating color image signals of the three primary colors R. G, and B as the interpolation results for each pixel.

In step S303, the image processor 125 performs gamma processing. In step S304, the image processor 125 performs various color adjusting processes such as noise reduction, saturation emphasis, hue correction, and edge emphasis, in order to improve the appearance of the image. In step S305, the image processor 125 compresses the color image signal having undergone the color adjustment in step S304 by a predetermined method such as JPEG, and outputs the compressed image data. In step S306, the controller 121 records the image data output from the image processor 125 on the recording medium 133, terminates the series of operations of the developing process, and returns the processing to the caller.

(Examples of Viewpoint Movement UI and Focus Adjustment UI)

Figure 19B:
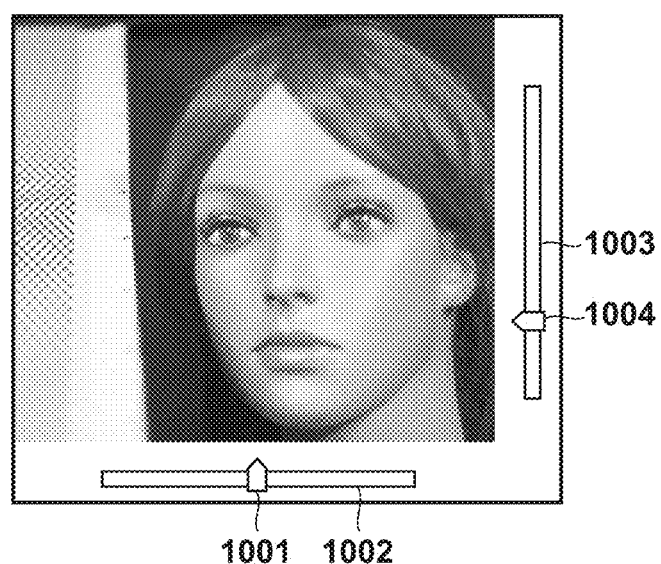

Operation examples of the above-described viewpoint movement UI and focus adjustment UI and examples of the synthetic image after the operations will be explained below with reference to FIGS. 19B to 19E. FIG. 19B shows an example of a displayed synthetic image obtained by performing the refocusing process by operating the focus adjustment UI. In response to a user operation of moving the slider 1004 downward, the controller 121 performs focus adjustment (the refocusing process) such that the front focus state becomes strong (by using the image processor 125), and displays the output image.

Figure 19C:
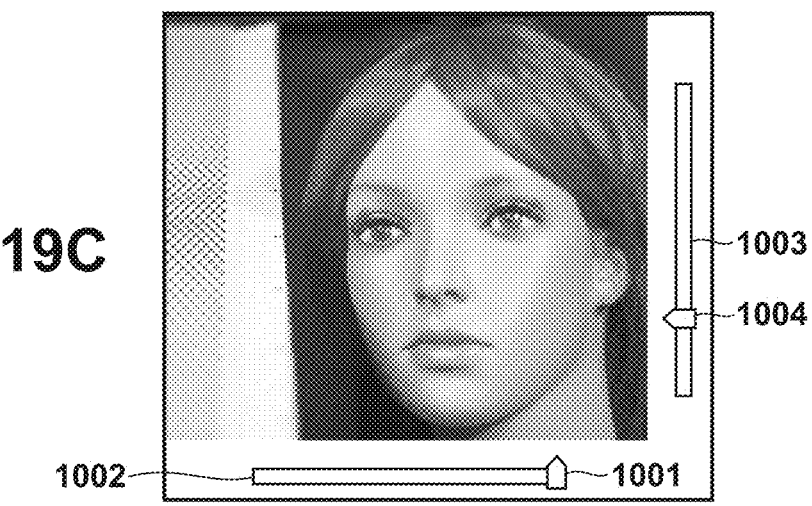
Figure 19D:
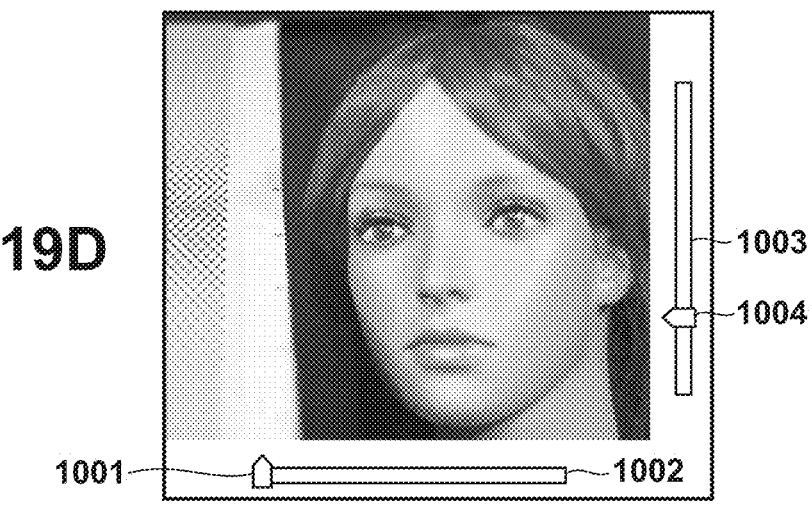

FIG. 19C shows an example of a displayed synthetic image on which the viewpoint moving process is performed by further moving the slider 1001 of the viewpoint movement UI to the right from FIG. 19B. In response to a user operation of moving the slider 1001 to the right, the controller 121 displays an output image by extending the depth of field by performing the viewpoint moving process (by using the image processor 125). Also, FIG. 19D shows an example of a displayed synthetic image obtained by extending the depth of field by performing the viewpoint moving process by moving the slider 1001 of the viewpoint movement UI to the left from FIG. 19B. By arranging the sliders and slider bars as operating members so that the viewpoint movement UI and focus adjustment UI can be operated in parallel as described above, the user can perform viewpoint movement, the extension of the depth of field, and the refocusing process in parallel (at the same time).

Figure 20:
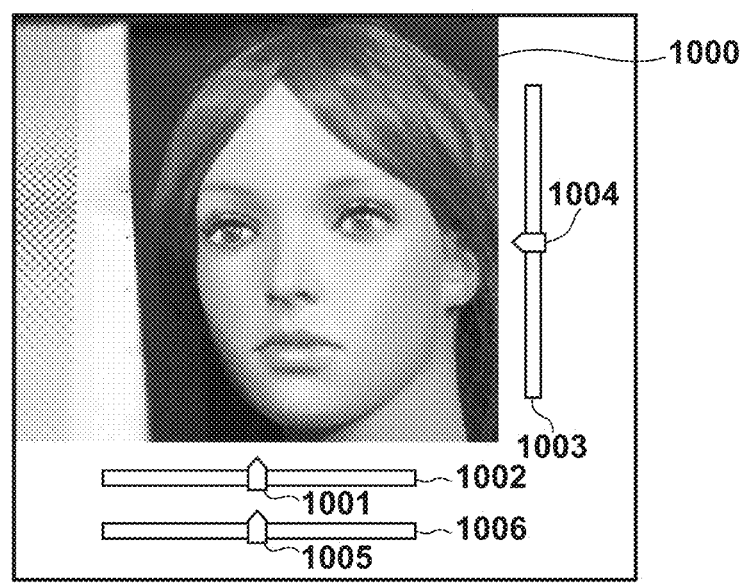
FIG. 20 is a view schematically showing an example in which a UT for an emphasis degree is added to the UIs according to the first embodiment.

FIG. 20 shows an example in which a UI capable of changing the degree of emphasis in the above-described parallax emphasizing process and sharpness processing is further added. In addition to the UIs shown in FIGS. 19A to 19D, the controller 121 arranges a slider 1005 and a slider bar 1006 capable of changing the degree of emphasis. An operation on the slider 1005 is to change a parameter corresponding to the variable k in the parallax emphasizing process or the application amount T in the sharpness processing, thereby changing the degree of emphasis in the synthetic image to be displayed.

Note that in this embodiment, the viewpoint movement UI is arranged in the horizontal direction because the viewpoint moving process is performed in the horizontal direction based on signals obtained from the image sensor in which each pixel is divided in to vertical direction. However, if the dividing direction in the image sensor is not the horizontal direction (for example, the vertical direction), the direction in which the viewpoint movement UI is arranged may also be set in accordance with the dividing direction (for example, the vertical direction). In this case, the focus adjustment UI can be arranged in a direction different from that of the viewpoint movement UI in order to distinguish between the two UIs more clearly, and can also be kept in the vertical direction in order to perform an operation for the focus position more intuitively.

As has been explained above, after an image signal containing intensity information and angle information of an incident light beam is obtained, an operation of moving the viewpoint and an operation of adjusting the focus position are accepted, and a synthetic image corresponding to the operations is generated and displayed. This allows the user to perform viewpoint movement, the extension of the depth of field, and adjustment (refocusing) of the focus position in parallel. In other words, an operation of displaying a viewpoint-changed image and an operation of displaying a focus-position-changed image can be performed in parallel based on a plurality of viewpoint images.

Also, by further accepting an operation of changing the degree of emphasis, it is possible to further perform a process of emphasizing the focus-adjusted synthetic image in parallel. In addition, when the pixel of the image sensor for obtaining the image signal containing the intensity information and angle information of an incident light beam is divided into a plurality of portions in the horizontal direction, the viewpoint movement UI is so arranged as to be operable in the horizontal direction. Since this matches the direction in which the viewpoint can move and the direction in which the user can perform operations, the user can perform the operations more intuitively.

Second Embodiment

The second embodiment will be explained below. In the second embodiment, an example in which viewpoint image manipulation is performed by switching vertical position display and horizontal position display of an image will be explained. The arrangement of a digital camera 100 of this embodiment is the same as that of the first embodiment, and a part of the parallax image manipulating process is different. Therefore, a repetitive explanation thereof will be omitted by denoting the same components by the same reference numerals, and the difference will mainly be explained.

(Series of Operations of Viewpoint Image Manipulating Process)

Figure 21:
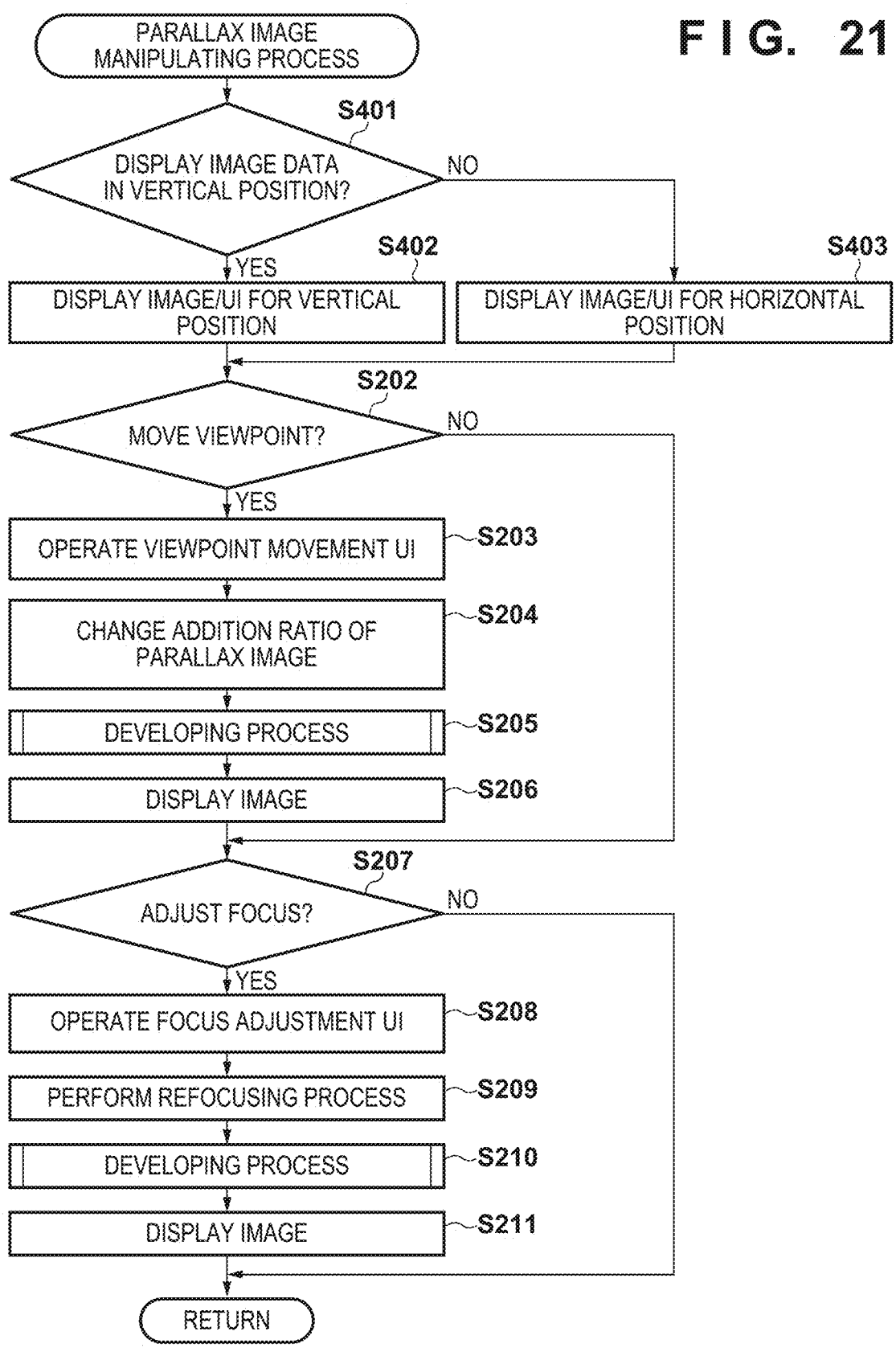
FIG. 21 is a flowchart showing a series of operations of a parallax image manipulating process according to the second embodiment.

The viewpoint image manipulating process according to this embodiment will be explained with reference to FIG. 21. In step S401, a controller 121 determines whether to perform vertical position display of image data. The controller 121 determines whether an input image is captured in the vertical position by, for example, referring to metadata of the image. If it is determined that the image is captured in the vertical position, the controller 121 advances the process to step S402 in order to perform vertical position display. On the other hand, if it is determined that the image is not captured in the vertical position, the controller 121 advances the process to step S403 in order to perform horizontal position display. Note that in the determination of step S401, vertical position display can be performed when the user sets vertical position display by using a button or the like of an operation unit 132 and it is also possible to obtain information indicating the pixel dividing direction of the image sensor from the metadata, and determine the display direction in accordance with the dividing direction.

In step S402, the controller 121 displays the image in the vertical position, and also displays a viewpoint movement UI such that the UI can be changed in the vertical direction, and a focus adjustment UI such that the UI can be changed in the horizontal direction. On the other hand, in step S403, the controller 121 displays the image in the horizontal direction, and also displays the viewpoint movement UI such that the UI can be changed in the horizontal direction, and the focus adjustment UI such that the UI can be changed in the vertical direction. After that, the controller 121 performs processes in steps S202 to S211 in the same manner as in the first embodiment, and returns the processing to the caller.

In this embodiment as explained above, the viewpoint movement UI and focus adjustment UI are dynamically switched in accordance with whether an input image is vertical position display or horizontal position display. Even when captured images having different display directions exist, therefore, the user can perform operations matching the direction in which viewpoint movement of the captured images can be performed.

Third Embodiment

The third embodiment will be explained below. The difference of the third embodiment is the use of an image sensor in which each pixel is divided into two in each of the horizontal direction and vertical direction. Accordingly, the arrangement of a digital camera 100 is the same as that of the first embodiment except this point. Therefore, a repetitive explanation will be omitted by denoting the same components by the same reference numerals, and the difference will mainly be explained.

Figure 22:
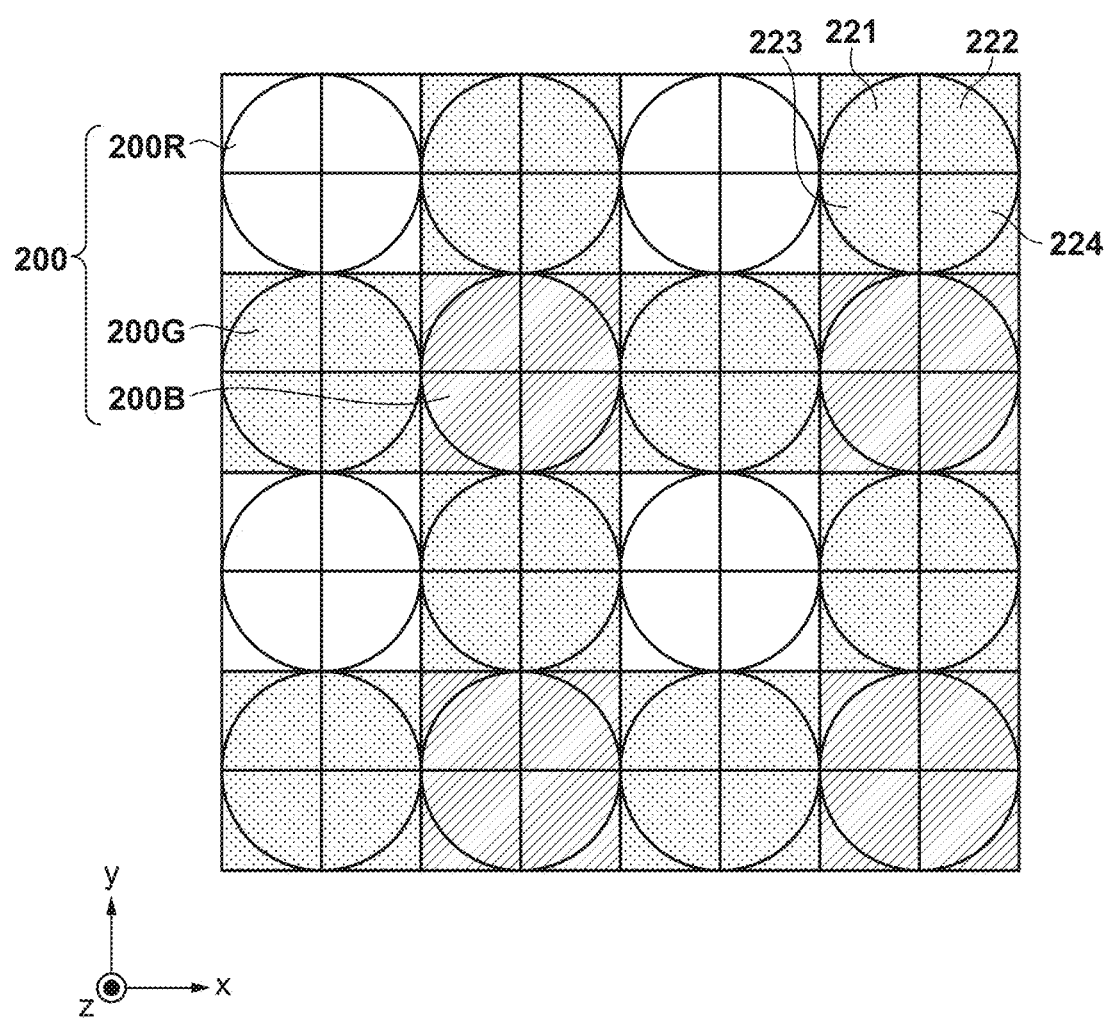
FIG. 22 is a view schematically showing a pixel array according to the third embodiment.

The arrays of pixels and subpixels in an image sensor 107 according to this embodiment will be explained with reference to FIG. 22. FIG. 22 shows the array of pixels by the range of 4 columns×4 rows, and the array of subpixels by the range of 8 columns×8 rows, in the image sensor 107 of this embodiment.

In this embodiment, in a 2 column×2 row pixel group 200 shown in FIG. 22, a pixel 200R having the spectral sensitivity of R (red) is arranged in the upper left corner, pixels 200G having the spectral sensitivity of G (green) are arranged in the upper right and lower left corners, and a pixel 200B having the spectral sensitivity of B (blue) is arranged in the lower right corner. Furthermore, each pixel is formed by subpixels 221 to 224 arranged into 2 columns×2 rows.

The image sensor 107 can obtain a captured image (subpixel signal) by arranging a large number of 4 columns×4 rows of pixels (8 columns×8 rows of subpixels) shown in FIG. 22 on a plane. The image sensor 107 is, for example, an image sensor in which a pixel period P is 4 µm, a number N of pixels is 5575 columns (horizontal direction)×3725 rows (vertical direction)=about 20750000 pixels, subpixel period PSUB is 2 µm, and a number NSUB of subpixels is 11150 columns (horizontal direction)×7450 rows (vertical direction)=about 83000000 pixels.

Figure 23A:
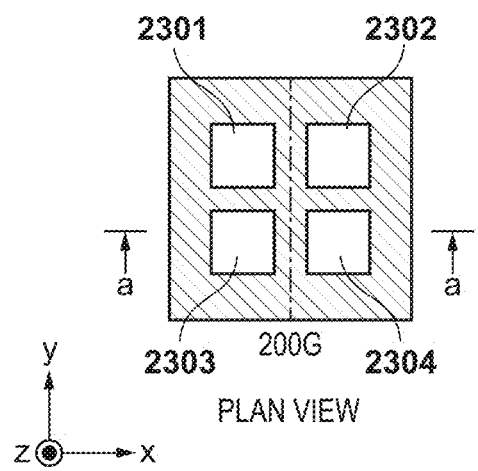
FIGS. 23A and 23B are a plan view and sectional view schematically showing a pixel according to the third embodiment.
Figure 23B:
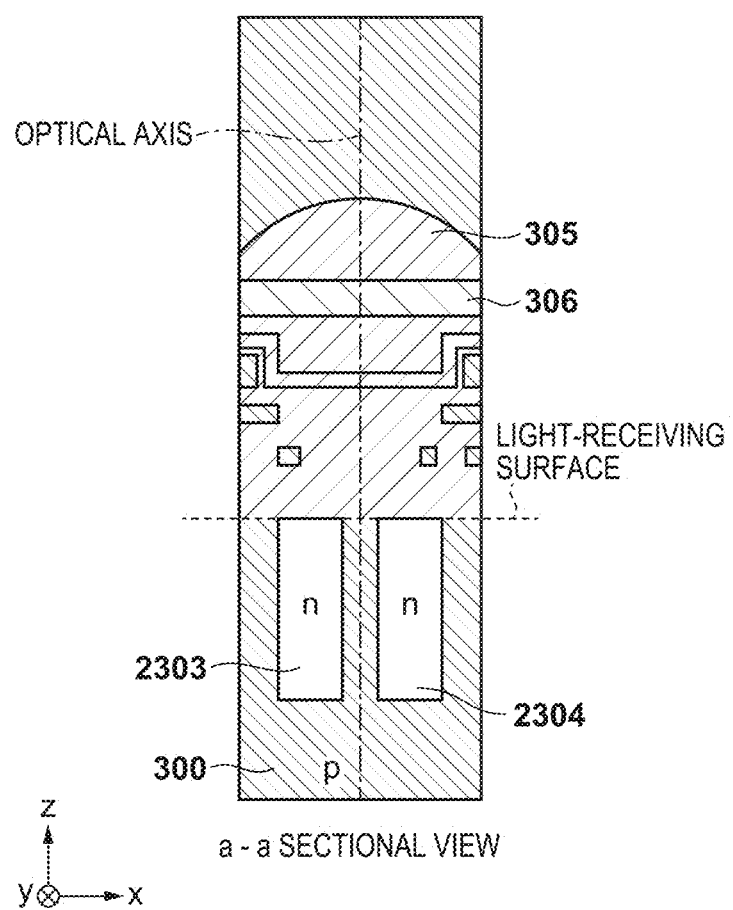

FIG. 23A is a plan view showing one pixel 200G shown in FIG. 22 from the light-receiving surface side (+z side) of the image sensor 107, and FIG. 23B is a sectional view showing an a –a section of FIG. 23A from the –y side. In the pixel 200G of this embodiment as shown in FIG. 23A, photoelectric converters 2301 to 2304 divided by NH (divided into two) in the x direction and divided by NV (divided into two) in the y direction are formed. The photoelectric converters 2301 to 2304 respectively correspond to the subpixels 221 to 224.

In this embodiment, a first viewpoint image is generated by collecting light reception signals of the subpixels 201 of the individual pixels likewise, a second viewpoint image is generated by collecting light reception signals of the subpixels 202 of the individual pixels, a third viewpoint image is generated by collecting light reception signals of the subpixels 203 of the individual pixels, and a fourth viewpoint image is generated by collecting light reception signals of the subpixels 204 of the individual pixels. Note that in this embodiment, each of the first to fourth viewpoint images is an image having the Bayer array, and a demosaicing process can be performed on the first to fourth viewpoint images as needed.

Assuming that j and i are integers, (j, i) represents the jth position in the row direction and the ith position in the column direction of the image sensor 107, and $A0(j, i)$, $B0(j, i)$, $C0(j, i)$, and $D0(j, i)$ respectively represent the first, second, third, and fourth viewpoint images of a pixel in the position (j, i). In this case, a captured image I is $I(j, i) = A0(j, i) + B0(j, i) + C0(j, i) + D0(j, i)$.

(Viewpoint Image Correction and Refocusing)

As in the first embodiment, a viewpoint change processing unit 155 performs contrast processing. That is, the viewpoint change processing unit 155 calculates a luminance $Y(j, i)$ of the captured image $I(j, i)$ having the Bayer array in accordance with equation (1). Also, the viewpoint change processing unit 155 calculates a high-frequency component $dY(j, i)$, a high-frequency component $dZ(j, i)$, and a contrast distribution $C(j, i)$.

Then, the viewpoint change processing unit 155 performs a process of emphasizing the parallax of the viewpoint images. The viewpoint change processing unit 155 enlarges the difference between the viewpoint images from the first viewpoint image $A0(j, i)$ to the fourth viewpoint image $D0(j, i)$ in accordance with equations (15) and (16), thereby performing parallax emphasizing conversion. By this processing, the viewpoint change processing unit 155 generates corrected viewpoint images from a first corrected viewpoint image $A(j, i)$ to a fourth corrected viewpoint image $D(j, i)$. In the following equations, $0 \le kAB$, kAC, kAD, kBC, kBD, $kCD \le 1$, and they are real numbers.

$$\begin{pmatrix} A_1 \\ B_1 \\ C_1 \\ D_1 \end{pmatrix} = \begin{pmatrix} 1-k_{AB}- & k_{AB} & k_{AC} & k_{AD} \\ k_{AC}-k_{AD} & & & \\ k_{AB} & 1-k_{AB}- & k_{BC} & k_{BD} \\ & k_{BC}-k_{BD} & & \\ k_{AC} & k_{BC} & 1-k_{AC}- & k_{CD} \\ & & k_{BC}-k_{CD} & \\ k_{AD} & k_{BD} & k_{CD} & 1-k_{AD}- \\ & & & k_{BD}-k_{CD} \end{pmatrix}^{-1} \begin{pmatrix} A_0 \\ B_0 \\ C_0 \\ D_0 \end{pmatrix} \quad (15)$$

$$A(j, i) = \frac{|A_1(j, i)| + A_1(j, i)}{2},$$ (16)

$$B(j, i) = \frac{|B_1(j, i)| + B_1(j, i)}{2},$$

$$C(j, i) = \frac{|C_1(j, i)| + C_1(j, i)}{2},$$

$$D(j, i) = \frac{|D_1(j, i)| + D_1(j, i)}{2}$$

Then, a refocus processing unit 156 performs a refocusing process by using the corrected viewpoint images output from the viewpoint change processing unit 155. More specifically, the refocus processing unit 156 performs shift addition on the first to fourth corrected viewpoint images A to D in accordance with equation (17) by using an integral shift amount s.

$$I(j,i;s)=A(j,i)+B(j,i+s)+C(j+s,i)+D(j+s,i+s) \quad (17)$$

That is, it is possible to generate a refocused image I(j, i;s) on each virtual image formation plane corresponding to the integral shift amount s. Note that the first to fourth corrected viewpoint images A to D have the Bayer array, so the refocused image I(j, i;s) is generated while holding the Bayer array by performing shift addition of equation (10) for each color by shift amount s=2n (n: an integer) as a multiple of 2. An image processor 125 performs a demosaicing process on the generated refocused image I(j, i;s).

Note that it is also possible, as needed, to apply the demosaicing process to the first to fourth corrected viewpoint images, and cause the refocus processing unit 156 to generate a refocused image by performing the shift addition process on the demosaiced first to fourth corrected viewpoint images. Note also that the refocus processing unit 156 can generate an interpolation signal between pixels of the first to fourth corrected viewpoint images, and generate a refocused image corresponding to a non-integral shift amount, as needed.

(Image Displacement Distribution)

An image displacement distribution of a viewpoint image according to this embodiment will be explained. An image displacement distribution in the pupil dividing direction in the horizontal direction is the same as that of the first embodiment, so an explanation thereof will be omitted. An image displacement distribution in the pupil dividing direction in the vertical direction will be explained.

The viewpoint change processing unit 155 moves a two-dimensional image by k pixels in only the pupil dividing direction in the vertical direction, and obtains the difference between a pixel of the first viewpoint image A0 and the third viewpoint image C0. Accordingly, a correlation calculation of adding a plurality of rows is defined by equation (18).

$$k \geq 0 \quad COR'(k) = \sum_{j}^{nj} \sum_{i}^{ni} |A0_{i(j+k)} - C0_{ij}| \quad (18)$$

$$k < 0 \quad COR'(k) = \sum_{j}^{nj} \sum_{i}^{ni} |A0_{ij} - C0_{i(j+k)}|$$

where A0$ij$ and C0$ij$ respectively represent the luminances of the ith pixels in the jth columns of the first viewpoint image A0 and third viewpoint image C0. Also, ni is a number representing the number of pixels to be used in the calculation, and nj is the number of image pairs in the column direction as targets of the correlation calculation.

The viewpoint change processing unit 155 calculates k which minimizes COR'(k) shown in equation (18) as the image displacement amount. Note that the subscript k is added to only j and irrelevant to i. This is so because the correlation calculation is performed while moving a two-dimensional image in only the pupil dividing direction in the vertical direction. Thus, the viewpoint change processing unit 155 can generate an image displacement distribution by calculating the image displacement amount in each region of the first viewpoint image A0 and third viewpoint image C0. Note that this embodiment uses A0 and C0, but it is also possible to perform the correlation calculation by using B0 and D0, or by using a signal obtained by adding A0 and B0 and a signal obtained by adding C0 and D0.

(Depth of Field Extending Process)

The viewpoint change processing unit 155 calculates the weighting coefficients of the viewpoint images in accordance with equations (19A) to (19D) by using a real coefficient w (−1≤w≤1).

$$W_a(j,i)=1-wT(j,i), \quad (19A)$$

$$W_b(j,i)=1+wT(j,i), \quad (19B)$$

$$W_c(j,i)=1+wT(j,i), \quad (19C)$$

$$W_d(j,i)=1+wT(j,i) \quad (19D)$$

where Wa(j, i) is the first weighting coefficient of the first viewpoint image A(j, i), Wb(j, i) is the second weighting coefficient of the second viewpoint image B(j, i), Wc(j, i) is the third weighting coefficient of the third viewpoint image C(j, i), and Wd(j, i) is the fourth weighting coefficient of the fourth viewpoint image D(j, i).

The viewpoint change processing unit 155 generates an output image I(j, i) in accordance equation (20) from the weighting coefficients corresponding to the respective viewpoint images.

$$I(j,i)=W_a(j,i)*A(j,i)+W_b(j,i)*B(j,i)+W_c(j,i)*C(j,i)+W_d(j,i)*D(j,i) \quad (20)$$

(Examples of Viewpoint Movement UI and Focus Adjustment UI)

Figure 24:
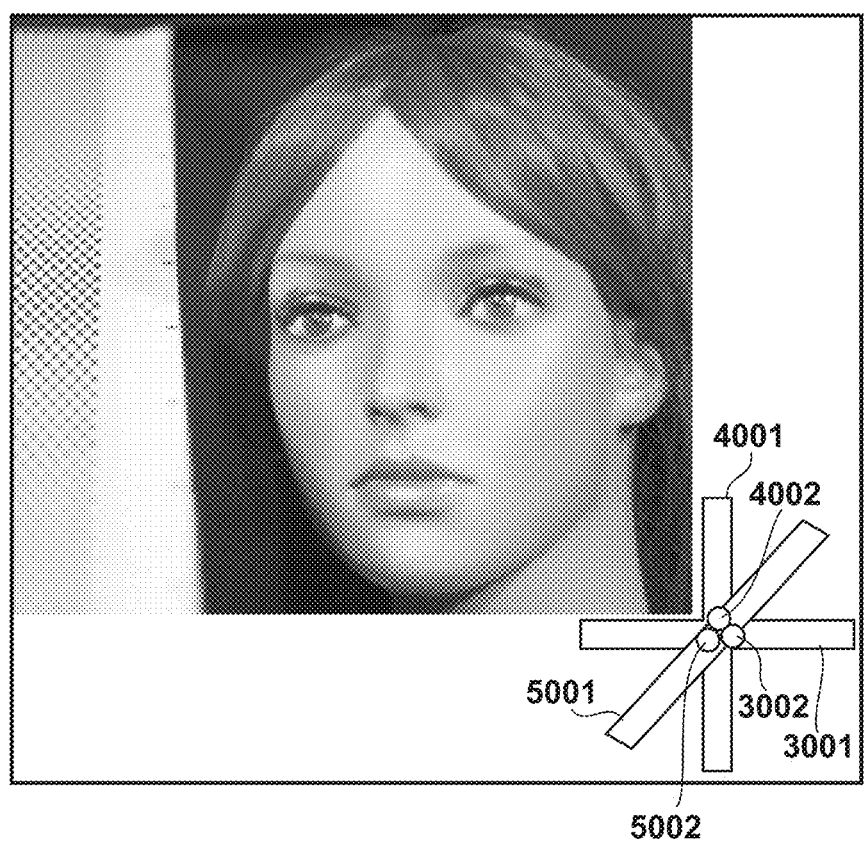
FIG. 24 is a view schematically showing a viewpoint movement UI and focus adjustment UT according to the third embodiment.

The arrangements of a viewpoint movement UI and focus adjustment UI according to this embodiment will be explained below with reference to FIG. 24. In the configuration of this embodiment, the pupil dividing direction is divided into two directions, that is, the horizontal direction and vertical direction, so the user can move the viewpoint in the vertical direction and horizontal direction. In this embodiment, therefore, two axes of sliders and slider bars are formed to allow the user to perform operations in the two directions.

A slider bar 3001 and a slider 3002 in the horizontal direction are arranged for viewpoint movement in the horizontal direction, and a slider bar 4001 and a slider 4002 in the vertical direction are arranged for viewpoint movement in the vertical direction. In the focus adjustment UI, a slider bar 5001 and a slider 5002 in a direction different from the directions in the viewpoint movement UI are arranged. Note that the focus adjustment UI is so arranged as to pass through the intersection of the viewpoint movement UI arranged in the form of a cross, but may also be arranged in another position. By thus moving the viewpoint movement sliders in the two directions, it is possible to change the weighting coefficients of the first to fourth viewpoint images, and generate images having different viewpoints. In addition, the viewpoint movement UI and focus adjustment UI can be operated in parallel (at the same time) as in the first embodiment.

In this embodiment as explained above, after an image signal containing the intensity information and angle information of an incident light beam is obtained, an operation of two-dimensionally moving the viewpoint (in the horizontal and vertical directions) and an operation of adjusting the focus position are accepted, and a synthetic image corresponding to these operations is generated and displayed. When it is possible to generate an image by two-dimensionally moving the viewpoint from an input image signal, therefore, the user can perform two-dimensional viewpoint movement and adjustment (refocusing) of the focus position in parallel.

Fourth Embodiment

The fourth embodiment will be explained below. In the fourth embodiment, an example in which a notation (display to be attached to the above-described viewpoint movement UI or the like) of a UI when manipulating a viewpoint image by switching an image to vertical position display or horizontal position display will be explained. The notation of the UI for manipulating a viewpoint movement indicates, for example, a direction in which the viewpoint of a viewpoint image is changed in response to the manipulation on the viewpoint image. The configuration of a digital camera 100 of this embodiment is the same as that of the first embodiment, and a part of the parallax image manipulating process is different. Therefore, a repetitive explanation will be omitted by denoting the same components by the same reference numerals, and the difference will mainly be explained.

(Series of Operations of Viewpoint Image Manipulating Process)

Figure 25A:
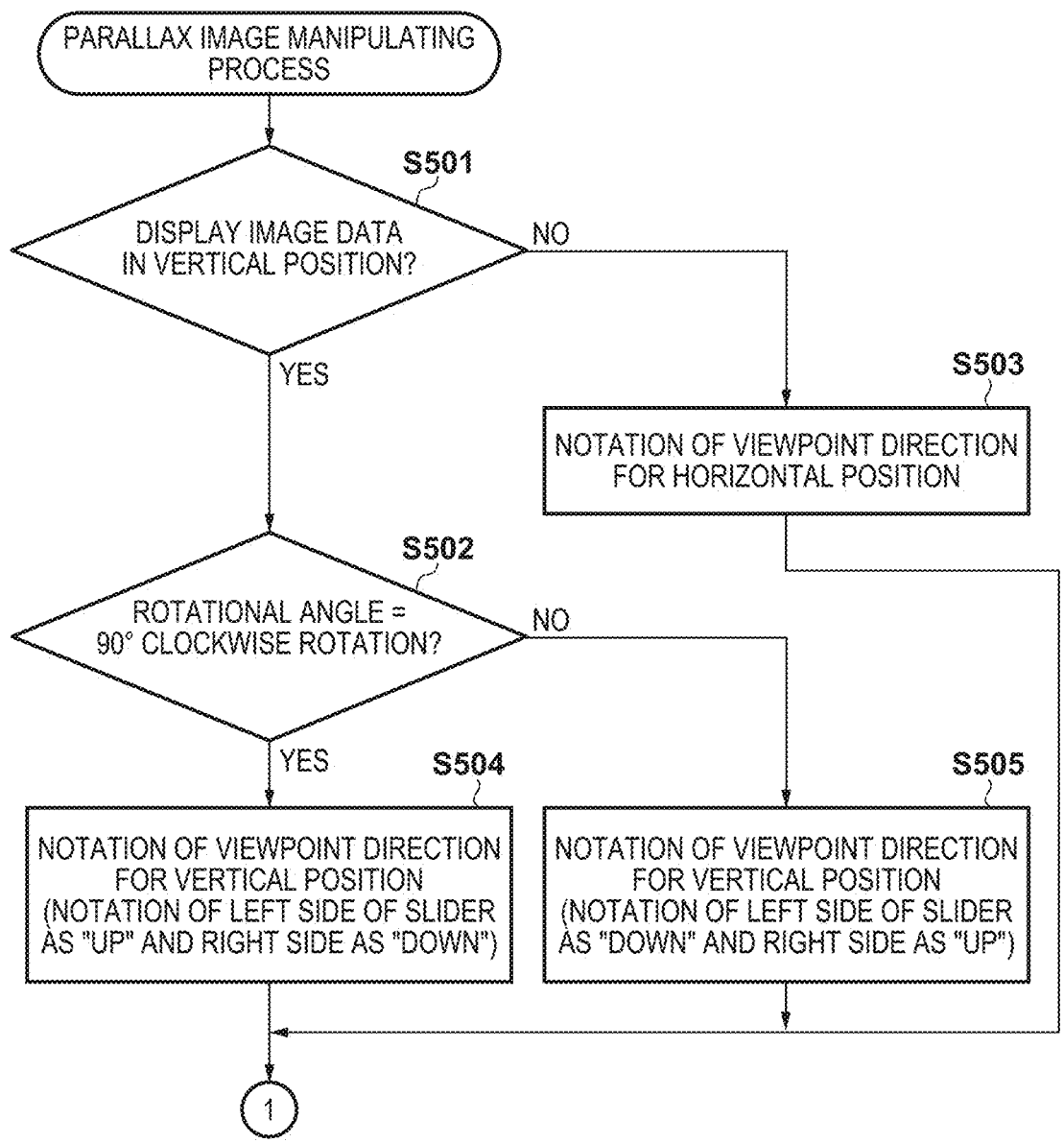
FIGS. 25A and 25B are flowcharts showing a series of operations of a parallax image manipulating process according to the fourth embodiment.
Figure 25B:
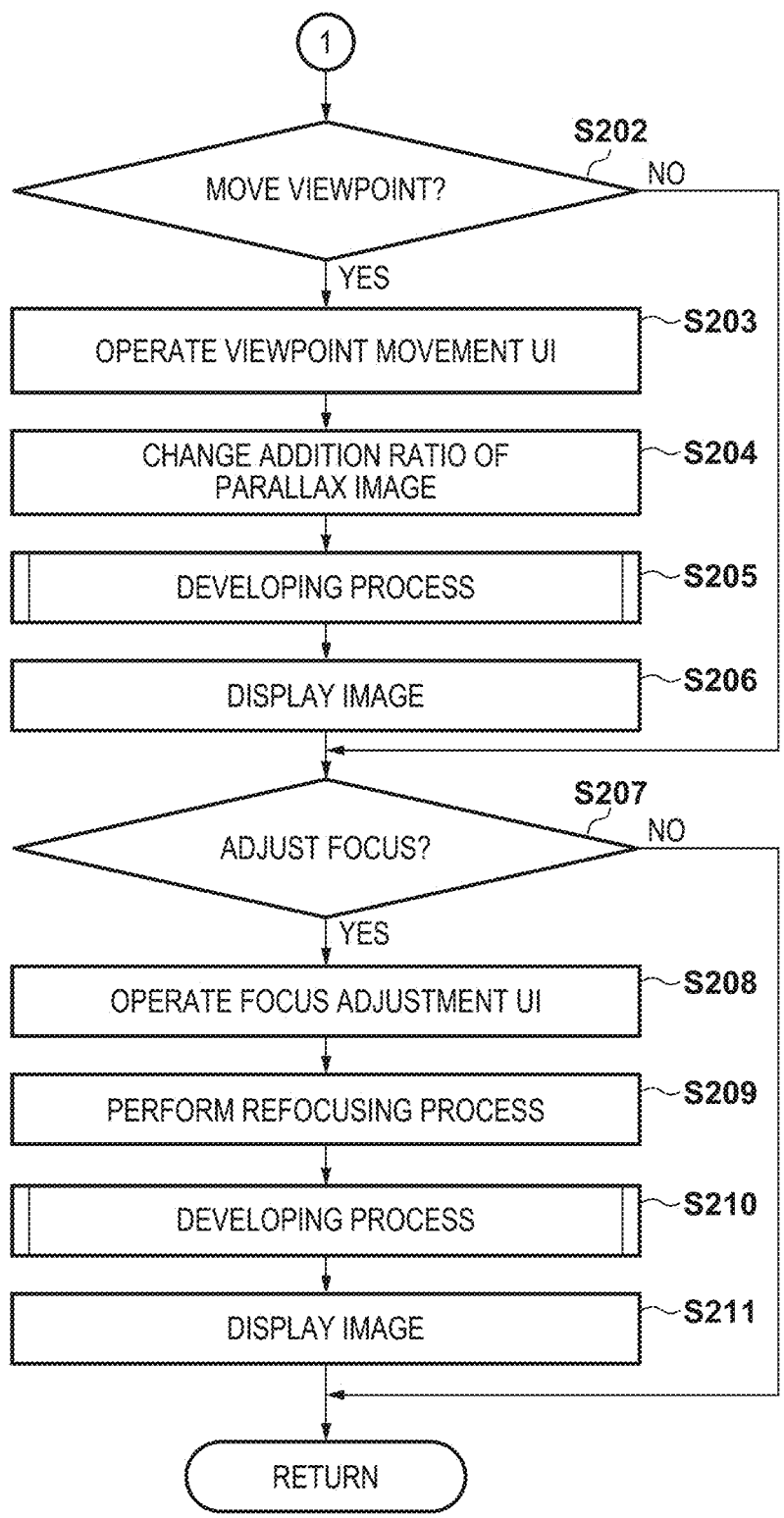

A viewpoint image manipulating process according to this embodiment will be explained with reference to FIGS. 25A and 25B. In step S501 of FIG. 25A, a controller 121 determines whether to display an input image in the vertical position, in order to determine whether to match the notation of a UI for manipulating a parallax image with vertical position display of an image. For example, the controller 121 determines whether the input image is an image captured in the vertical position by referring to metadata of the image. If it is determined that the input image is to be displayed in the vertical position, the controller 121 advances the process to step S502 in order to match the notation of the UI with the vertical position. On the other hand, if it is determined that the input image is not an image captured in the vertical position, the controller 121 advances the process to step S503 in order to set a horizontal-position notation. In step S502, the controller 121 further determines the rotational angle of the image. For example, the controller 121 determines the angle (for example, a vertical position obtained by a 90° clockwise rotation, or a vertical position obtained by a 90° counterclockwise rotation) of the captured image by referring to the metadata of the input image. If it is determined that the input image is an image captured by a 90° clockwise rotation, the controller 121 advances the process to step S504 in order to set a notation for 90° clockwise rotation on the display unit 131. On the other hand, if it is determined that the captured image is an image not captured by a 90° clockwise rotation (but captured by vertical-position display), the controller 121 advances the process to step S505 in order to set a notation for 90° counterclockwise rotation. Note that the determinations in steps S501 and S502 may also be performed such that vertical-position notation is set if the user sets vertical-position display by a button or the like on an operation unit 132. It is also possible to obtain information indicating the pixel dividing direction in the image sensor from the metadata, and determine the notation of the UI for manipulating a parallax image in accordance with the dividing direction.

Figure 26:
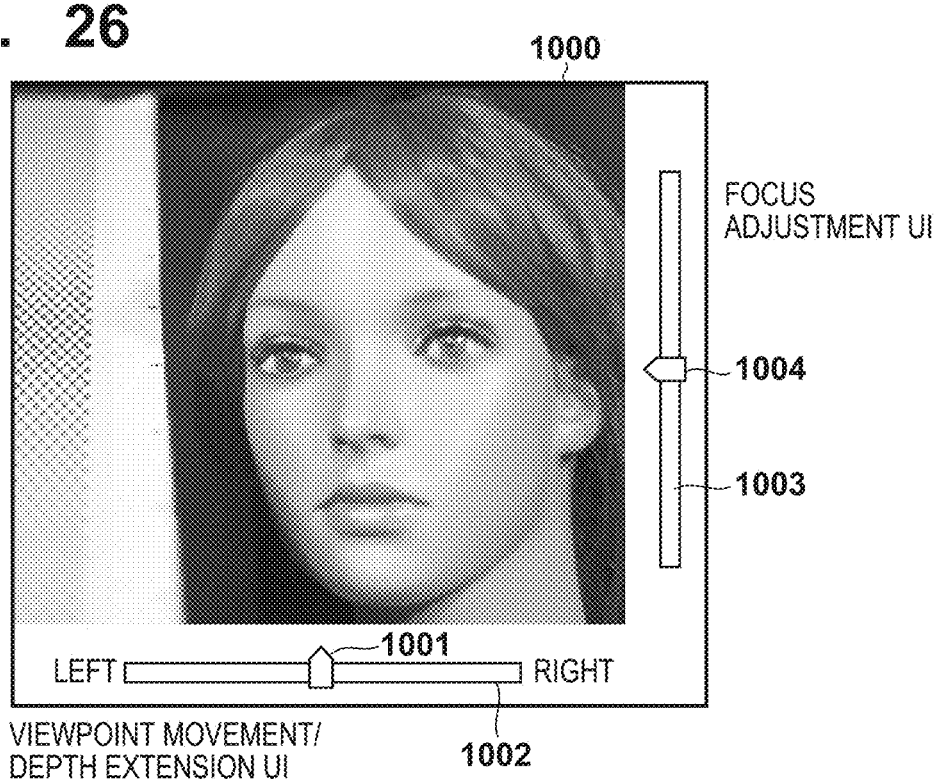
FIG. 26 is a view schematically showing notation examples of a viewpoint movement UI and focus adjustment UI according to the fourth embodiment.
Figure 27:
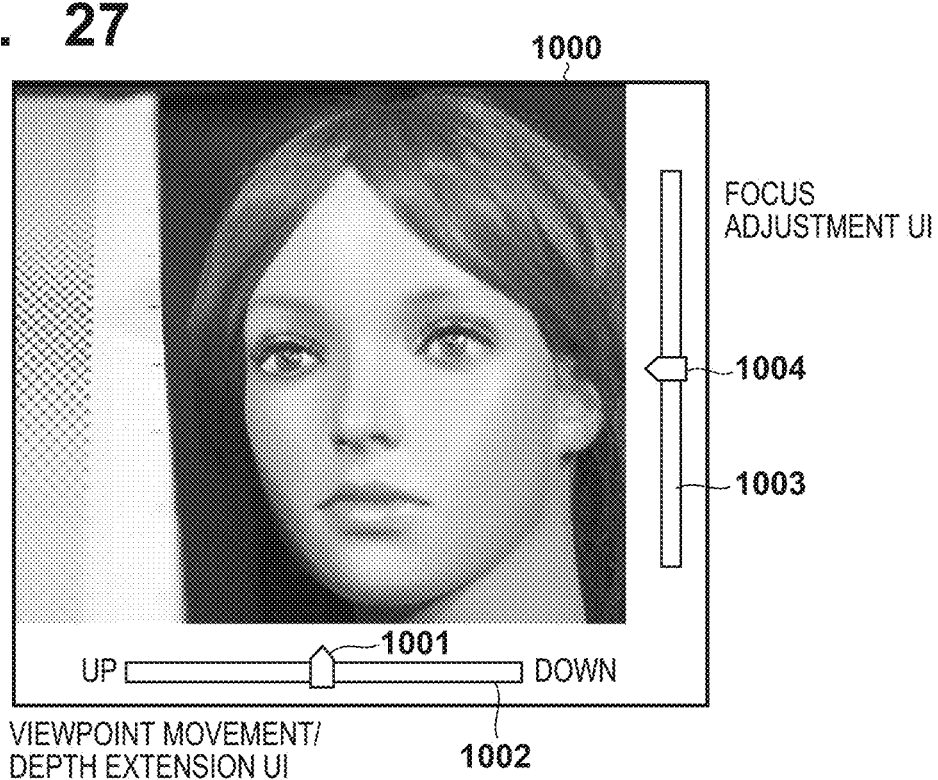
FIG. 27 is a view schematically showing notation examples of the viewpoint movement UI and focus adjustment UI according to the fourth embodiment.

In step S503, the controller 121 displays the image in the horizontal position, and displays the notation of the UI for operating viewpoint movement by a horizontal-position notation (right-and-left notation) (FIG. 26). In step S501, the controller 121 displays the image in the vertical position of 90° clockwise rotation, and also displays the notation of the UI for operating viewpoint movement such that the left side of a slider is "up" and the right side is "down" (FIG. 27). In step S505, the controller 121 displays the image in the vertical position of 90° clockwise rotation, and displays the notation of the UI for operating viewpoint movement such that the left side of the slider is "down" and the right side is "up" (FIG. 28). This enables the controller 121 to switch the notations of the UI for operating viewpoint movement in accordance with the viewpoint movement UI, and switch the notations in accordance with the rotational angle in the same vertical position. When completing the processes in steps S503 to S505, the controller 121 performs processes in steps S202 to S211 shown in FIG. 25B in the same manner as in the first embodiment, and returns the processing to the caller.

In this embodiment as described above, the notations of the viewpoint movement UI are dynamically switched in accordance with whether an input image is displayed in the vertical position or horizontal position, and with the rotational angle of the image. Even when captured images having different display directions exist, the user can perform an operation matching the direction in which viewpoint movement of each captured image can be performed.

The present invention makes it possible to concurrently perform an operation of displaying a viewpoint changed image and an operation of displaying an image having a changed focus position, based on a plurality of viewpoint images.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:
at least one processor or circuit configured to perform the operations of following units:
an obtaining unit configured to obtain a plurality of viewpoint images having parallax in a predetermined direction;
an operating unit configured to accept a viewpoint changing operation; and
a processing unit configured to generate, based on the plurality of viewpoint images, a display image by changing a viewpoint in accordance with the viewpoint changing operation,
a display control unit configured to display the display image and a notation indicating a viewpoint changing direction in accordance with the viewpoint changing operation on a display device,
wherein, in a case where the display image whose viewpoint can be changed in the predetermined direction is rotated and displayed at different angle, the display control unit changes the notation in accordance with a direction in which viewpoint can be changed on the display image that is rotated and displayed at the different angle.

2. The image processing apparatus according to claim 1, wherein in a case where the display image can be generated by changing the viewpoint in the predetermined direction based on the plurality of viewpoint images, the operating unit accepts the viewpoint changing operation along the predetermined direction.

3. The image processing apparatus according to claim 2, wherein the operating unit accepts the viewpoint changing operation, such that the change in viewpoint in the predetermined direction increases as a position moves away from a predetermined position in the predetermined direction, and the change in viewpoint increases in a direction opposite to the predetermined direction as a position moves away to an opposite side from the predetermined position along the predetermined direction.

4. The image processing apparatus according to claim 2, wherein a predetermined direction is a horizontal direction or a vertical direction.

5. The image processing apparatus according to claim 4, wherein in a case where displaying, in a vertical position, the display image whose viewpoint can be changed in a horizontal direction in a horizontal position, the operating unit accepts the viewpoint changing operation in a vertical direction.

6. The image processing apparatus according to claim 5, wherein the display control unit changes the notation in accordance with a direction in which the operating unit accepts the viewpoint changing operation.

7. The image processing apparatus according to claim 1, wherein the operating unit accepts the viewpoint changing operation in a state in which a display image based on the plurality of viewpoint images is displayed.

8. The image processing apparatus according to claim 1, wherein:
the operating unit further accepts an operation of changing a degree of edge enhancement in the display image, and
the processing unit performs edge enhancement on a focused region in the display image in accordance with the degree of edge enhancement.

9. The image processing apparatus according to claim 1, wherein the processing unit generates the display image by changing a weight for adding the plurality of viewpoint images in accordance with the viewpoint changing operation, and adding the plurality of viewpoint images by using the weight.

10. The image processing apparatus according to claim 1, wherein
the operating unit further accepts a focus position changing operation, and
the display control unit displays the display image whose focus position is changed in accordance with the focus position changing operation on the display device.

11. The image processing apparatus according to claim 10, wherein in a case where the display image can be generated by changing the viewpoint in the predetermined direction based on the plurality of viewpoint images, the operating unit accepts the focus position changing operation along a direction different from the predetermined direction.

12. The image processing apparatus according to claim 11, wherein the operation unit accepts the focus position changing operation, such that the change in focus position increases as the focus position changing operation moves away from a predetermined position in an operation accepting direction.

13. The image processing apparatus according to claim 10, wherein the processing unit generates the display image by changing a shift amount between the plurality of viewpoint images in accordance with the focus position changing operation, and adding the plurality of viewpoint images shifted by the shift amount.

14. An imaging apparatus comprising:
an image sensor in which pixels each including a plurality of subpixels are two-dimensionally arranged, and which outputs a plurality of viewpoint images having parallax in a predetermined direction; and
at least one processor or circuit configured to perform the operations of following units:
an operating unit configured to accept a viewpoint changing operation; and
a processing unit configured to generate, based on the plurality of viewpoint images, a display image by changing a viewpoint in accordance with the viewpoint changing operation, and
a display control unit configured to display the display image and a notation indicating a viewpoint changing direction in accordance with the viewpoint changing operation on a display device, wherein in the image sensor, the plurality of subpixels are arranged in a predetermined direction in the pixel, and in a case where the display image whose viewpoint can be changed in the predetermined direction is rotated and displayed at different angle, the display control unit changes the notation in accordance with a direction in which viewpoint can be changed on the display image that is rotated and displayed at the different angle.

15. The imaging apparatus according to claim 14, wherein in a case where the display image is displayed in the horizontal position based on the plurality of viewpoint images captured in a horizontal position by using the imaging apparatus, the operating unit accepts the viewpoint changing operation along the predetermined direction, and in a case where the display image is displayed in a vertical position based on the plurality of viewpoint images captured in the horizontal position, the operating unit accepts the viewpoint changing operation along a direction perpendicular to the predetermined direction.

16. The imaging apparatus according to claim 15, wherein the display control unit changes the notation in accordance with a rotational angle from a vertical position or a horizontal position in which the plurality of viewpoint images are captured.

17. A control method of an image processing apparatus, comprising:
   obtaining a plurality of viewpoint images having parallax in a predetermined direction;
   accepting a viewpoint changing operation;
   generating, based on the plurality of viewpoint images, a display image by changing a viewpoint in accordance with the viewpoint changing operation, and
   controlling display of the display image and a notation indicating a viewpoint changing direction in accordance with the viewpoint changing operation on a display device,
   wherein, in a case where the display image whose viewpoint can be changed in the predetermined direction is rotated and displayed at different angle, the controlling includes changing the notation in accordance with a direction in which viewpoint can be changed on the display image that is rotated and displayed at the different angle.

18. A control method of an imaging apparatus comprising an image sensor in which pixels each including a plurality of subpixels are two-dimensionally arranged, and which outputs a plurality of viewpoint images having parallax in a predetermined direction, comprising:

obtaining the plurality of viewpoint images output from the image sensor;
accepting a viewpoint changing operation and
generating, based on the plurality of viewpoint images, a display image by changing a viewpoint in accordance with the viewpoint changing operation, and
controlling display of the display image and a notation indicating a viewpoint changing direction in accordance with the viewpoint changing operation on a display device,
wherein in the image sensor, the plurality of subpixels are arranged in a predetermined direction in the pixel, and
wherein, in a case where the display image whose viewpoint can be changed in the predetermined direction is rotated and displayed at different angle, the controlling includes changing the notation in accordance with a direction in which viewpoint can be changed on the display image that is rotated and displayed at the different angle.

19. A non-transitory computer-readable storage medium storing a program for causing a computer to execute a control method of an image processing apparatus comprising an image sensor in which pixels each including a plurality of subpixels are two-dimensionally arranged, and which outputs a plurality of viewpoint images having parallax in a predetermined direction, comprising:
   obtaining the plurality of viewpoint images output from the image sensor;
   accepting a viewpoint changing operation;
   generating, based on the plurality of viewpoint images, a display image by changing a viewpoint in accordance with the viewpoint changing operation, and
   controlling display of the display image and a notation indicating a viewpoint changing direction in accordance with the viewpoint changing operation on a display device,
   wherein in the image sensor, the plurality of subpixels are arranged in a predetermined direction in the pixel, and
   wherein, in a case where the display image whose viewpoint can be changed in the predetermined direction is rotated and displayed at different angle, the controlling includes changing the notation in accordance with a direction in which viewpoint can be changed on the display image that is rotated and displayed at the different angle.

* * * * *